(12) United States Patent
Teranishi et al.

(10) Patent No.: US 9,791,954 B2
(45) Date of Patent: *Oct. 17, 2017

(54) DISPLAY DEVICE AND ELECTRONIC APPARATUS

(71) Applicant: Japan Display Inc., Tokyo (JP)

(72) Inventors: Yasuyuki Teranishi, Tokyo (JP); Koji Noguchi, Tokyo (JP); Hidetoshi Komatsu, Tokyo (JP); Gen Koide, Tokyo (JP); Daisuke Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/386,978

(22) Filed: Dec. 21, 2016

(65) Prior Publication Data

US 2017/0102807 A1    Apr. 13, 2017

Related U.S. Application Data

(63) Continuation of application No. 14/985,894, filed on Dec. 31, 2015, which is a continuation of application
(Continued)

(30) Foreign Application Priority Data

Mar. 26, 2013  (JP) ................................ 2013-065177
Nov. 8, 2013   (JP) ................................ 2013-232339

(51) Int. Cl.
*G06F 3/045* (2006.01)
*G06F 3/041* (2006.01)
(Continued)

(52) U.S. Cl.
CPC ............ *G06F 3/0412* (2013.01); *G06F 3/044* (2013.01); *G06F 3/0416* (2013.01);
(Continued)

(58) Field of Classification Search
USPC .................. 345/173, 174, 98, 102, 211, 212
See application file for complete search history.

(56) References Cited

U.S. PATENT DOCUMENTS 6,317,122 B1   11/2001  Yamazaki
8,411,117 B2   4/2013   Fujioka et al.
(Continued)

FOREIGN PATENT DOCUMENTS

CN    1339934       3/2002
CN    102436086     5/2012
(Continued)

OTHER PUBLICATIONS

Chinese Office Action (with English translation) issued on Sep. 30, 2016 in corresponding Chinese Application No. 201410108809 (as pages).
(Continued)

*Primary Examiner* — Thuy Pardo
(74) *Attorney, Agent, or Firm* — K&L Gates LLP

(57) ABSTRACT

According to an aspect, a display device includes: a display section that has a first period to consume predetermined power and a second period to consume less power than in the first period, and power consumption of which periodically changes by repeating the first period and the second period; a smoothing capacitor that stabilizes power supplied to the display section; and a power consumption unit that consumes the supplied power in the second period.

3 Claims, 26 Drawing Sheets

Related U.S. Application Data

No. 14/204,519, filed on Mar. 11, 2014, now Pat. No. 9,251,758.

(51) Int. Cl.
*G09G 3/36* (2006.01)
*G06F 3/044* (2006.01)

(52) U.S. Cl.
CPC ... *G09G 3/3696* (2013.01); *G09G 2310/0297* (2013.01); *G09G 2330/021* (2013.01)

(56) References Cited

U.S. PATENT DOCUMENTS

| | | | |
|---|---|---|---|
| 2002/0036636 A1 | 3/2002 | Yanagi et al. | |
| 2007/0195049 A1* | 8/2007 | Choi | G09G 3/3655 345/98 |
| 2007/0242030 A1* | 10/2007 | Kim | G01J 1/46 345/102 |
| 2010/0214254 A1* | 8/2010 | Tsai | G06F 1/3262 345/174 |
| 2010/0265209 A1* | 10/2010 | Nurmi | G06F 1/3265 345/174 |
| 2011/0090207 A1* | 4/2011 | Yamazaki | H01L 27/1225 345/211 |
| 2011/0141151 A1 | 6/2011 | Fujioka et al. | |
| 2012/0050217 A1 | 3/2012 | Noguchi et al. | |
| 2012/0075240 A1 | 3/2012 | Kida et al. | |
| 2012/0154336 A1 | 6/2012 | Lee | |
| 2012/0218247 A1* | 8/2012 | Yamauchi | G09G 3/3648 345/211 |
| 2012/0218252 A1* | 8/2012 | Yamauchi | G09G 3/36 345/212 |
| 2013/0050146 A1 | 2/2013 | Saitoh et al. | |
| 2013/0271403 A1 | 10/2013 | Nagahara | |
| 2014/0085291 A1 | 3/2014 | Gondo | |
| 2014/0125619 A1 | 5/2014 | Panther et al. | |
| 2016/0035275 A1* | 2/2016 | Yamazaki | H01L 27/1225 345/212 |

FOREIGN PATENT DOCUMENTS

| | | |
|---|---|---|
| CN | 102906805 | 1/2013 |
| JP | H11-102169 | 4/1999 |
| JP | 2002123234 | 4/2002 |
| JP | 2010-250030 | 11/2010 |
| JP | 2011-076708 | 4/2011 |
| JP | 2012247462 | 12/2012 |
| KR | 10-2007-0119449 | 12/2007 |
| KR | 10-2012-0019371 | 3/2012 |
| KR | 10-2012-0033238 | 4/2012 |
| WO | 2011145360 | 11/2011 |

OTHER PUBLICATIONS

Office Action issued in connection with Korean Patent Application No. 10-2014-0032578, mailed Dec. 31, 2014. (4 pages).

Korean Office Action (with English translation) issued on May 30, 2016 in corresponding Korean application No. 10-2014-0032578 (8 pages).

Japanese Office Action issued Aug. 9, 2016 in corresponding Japanese Application No. 2013-232339.

\* cited by examiner

DISPLAY DEVICE AND ELECTRONIC APPARATUS

CROSS REFERENCES TO RELATED APPLICATIONS

The present application is a continuation of U.S. patent application Ser. No. 14/985,894, filed on Dec. 31, 2015, which application is a continuation of U.S. patent application Ser. No. 14/204,519, filed on Mar. 11, 2014, issued as U.S. Pat. No. 9,251,758 on Feb. 2, 2016, which application claims priority to Japanese Priority Patent Application JP 2013-065177 filed in the Japan Patent Office on Mar. 26, 2013, and Japanese Priority Patent Application JP 2013-232339 filed in the Japan Patent Office on Nov. 8, 2013, the entire content of which is hereby incorporated by reference.

BACKGROUND

1. Technical Field

The present disclosure relates to a display device that displays an image and an electronic apparatus including the display device.

2. Description of the Related Art

In recent years, various types of display devices such as liquid-crystal display devices, plasma display devices, and organic-electroluminescence (EL) display devices are developed in view of display quality, power consumption, and the like, and are applied to various electronic apparatuses such as mobile phones and personal digital assistants as well as stationary display devices according to the characteristics thereof.

The display device generally displays an image by performing line-sequential scanning (for example, Japanese Patent Application Laid-open Publication No. 2010-250030 and Japanese Patent Application Laid-open Publication No. 2011-76708). Specifically, for example, in the liquid-crystal display device, a scan-line-signal drive circuit (a gate driver) first selects one row (one horizontal line) from among pixels arrayed in a matrix as a target for display drive. Then, a signal-line drive circuit (a source driver) supplies a pixel signal to the selected pixels. This configuration causes the pixel signal to be written in the pixels associated with the selected one horizontal line. The display device performs such a write operation of a pixel signal while sequentially scanning the entire display surface, thereby displaying an image.

A smoothing capacitor is sometimes incorporated into a power supply of the display device. The smoothing capacitor suppresses variations of a power supply voltage. This configuration stabilizes power supplied to the display device. However, in some operation conditions of the display device, a voltage applied to the smoothing capacitor may periodically change. If the voltage applied to the smoothing capacitor periodically changes, the smoothing capacitor may vibrate due to a piezoelectric effect and the audible noise may occur.

For the foregoing reasons, there is a need for a display device and an electronic apparatus that can suppress or reduce the audible noise of a smoothing capacitor.

SUMMARY

According to an aspect, a display device includes: a display section that has a first period to consume predetermined power and a second period to consume less power than in the first period, and power consumption of which periodically changes by repeating the first period and the second period; a smoothing capacitor that stabilizes power supplied to the display section; and a power consumption unit that consumes the supplied power in the second period.

According to another aspect, an electronic apparatus includes the display device.

Additional features and advantages are described herein, and will be apparent from the following Detailed Description and the figures.

DETAILED DESCRIPTION

Embodiments of the present disclosure will be explained below in detail with reference to the accompanying drawings. Explanations are made in the following order.
1. Overall configuration example
2. Basic principle of capacitive touch detection
3. Coupling example between power supply circuit and display device
4. Embodiments
5. Application examples
6. Aspects of the present disclosure

1. Overall Configuration Example

Figure 1:
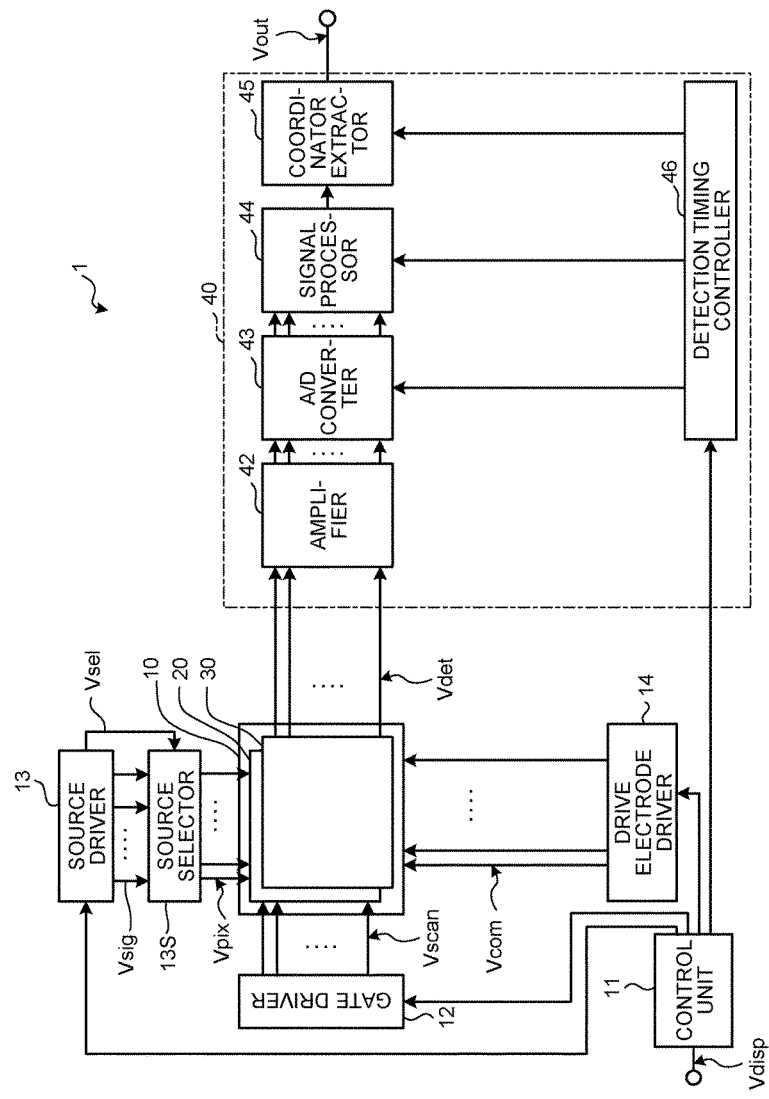
FIG. 1 is a block diagram of a configuration example of a display device with a touch detection function.

FIG. 1 is a block diagram of a configuration example of a display device with a touch detection function according to the present disclosure. A display device 1 with a touch detection function includes a display unit 10 with a touch detection function, a control unit 11, a gate driver 12, a source driver 13, a source selector 13S, a drive electrode driver 14, and a touch detection unit 40. The display device 1 with a touch detection function is a displaying device in which the display unit 10 with a touch detection function is incorporated with a touch detection function therein. The display unit 10 with a touch detection function is a so-called "in-cell" device having a capacitive touch detection device 30 integrally incorporated into a liquid-crystal display unit 20 that uses liquid-crystal display elements as display elements. The display unit 10 with a touch detection function can be a so-called "on-cell" device having the capacitive touch detection device 30 mounted on the liquid-crystal display unit 20 that uses liquid-crystal display elements as display elements. In the case of the on-cell device, the touch detection device 30 can be provided on the liquid-crystal display unit 20, or the touch detection device 30 can be provided above the liquid-crystal display unit 20 with another layer interposed therebetween, not on the liquid-crystal display unit 20.

The liquid-crystal display unit 20 performs display by sequentially scanning horizontal lines one by one according to a scanning signal Vscan supplied from the gate driver 12 as explained below. The control unit 11 is a circuit that supplies a control signal to the gate driver 12, the source driver 13, the drive electrode driver 14, and the touch detection unit 40 based on a video signal Vdisp supplied from outside to control these units to operate synchronously with each other. A control device according to the present disclosure includes the control unit 11, the gate driver 12, the source driver 13, and the drive electrode driver 14.

The gate driver 12 has a function to sequentially select one horizontal line as a target for display drive of the display unit 10 with a touch detection function based on the control signal supplied from the control unit 11.

The source driver 13 is a circuit for supplying a pixel signal Vpix to each of pixels Pix (sub-pixels SPix) of the display unit 10 with a touch detection function based on the control signal supplied from the control unit 11. The source driver 13 is supplied with, for example, R (red), G (green), and B (Blue) video data of 6 bits. The source driver 13 generates a video signal Vsig in which a plurality of pixel signals Vpix corresponding to respective sub-pixels SPix are time-divisionally multiplexed, from the video data of one horizontal line and supplies the generated video signal Vsig to the source selector 13S. The source driver 13 also generates a selection control signal Vsel required for demultiplexing the pixel signals Vpix multiplexed into the video signal Vsig and supplies the selection control signal Vsel to the source selector 13S together with the video signal Vsig. The source selector 13S can reduce the number of wirings between the source driver 13 and the liquid-crystal display unit 20.

The drive electrode driver 14 is a circuit that supplies a touch-detection drive signal (a touch drive signal, hereinafter also simply referred to as "drive signal") VcomAC and a display drive voltage VcomDC as a display voltage to a drive electrode COML (explained later) of the display unit 10 with a touch detection function based on the control signal supplied from the control unit 11.

The touch detection unit 40 is a circuit that detects whether or not there is a touch (a contact state explained later) to the touch detection device 30 based on the control signal supplied from the control unit 11 and a touch detection signal Vdet supplied from the touch detection device 30 of the display unit 10 with a touch detection function and, when there is a touch, obtains coordinates and the like of the touch in a touch detection area. The touch detection unit 40 includes an amplifier 42, an analog/digital (A/D) converter 43, a signal processor 44, a coordinator extractor 45, and a detection timing controller 46.

The amplifier 42 amplifies the touch detection signal Vdet supplied from the touch detection device 30. The amplifier 42 can include a low-pass analog filter that removes a high-frequency component (a noise component) included in the touch detection signal Vdet, retrieves a touch component, and outputs these components.

In the following explanations, among constituent elements of the display device 1 with a touch detection function illustrated in FIG. 1, those used primarily for display are also collectively referred to as "display section". The "display section" includes, for example, the liquid-crystal display unit 20, the gate driver 12, the source driver 13, and the drive electrode driver 14.

2. Basic Principle of Capacitive Touch Detection

Figure 2:
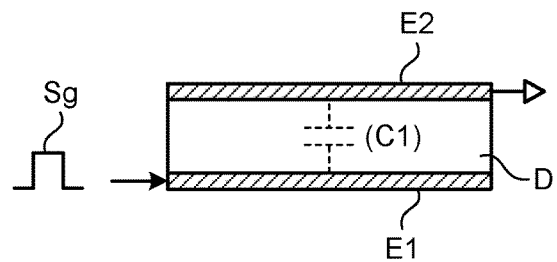
FIG. 2 is an explanatory diagram illustrating a state where a finger is neither in contact with nor in proximity to a touch detection device for explaining a basic principle of capacitive touch detection.
Figure 3:
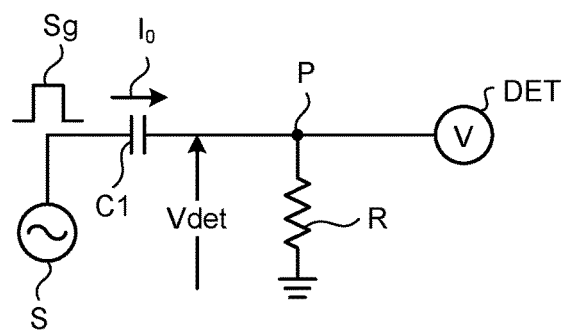
FIG. 3 is an explanatory diagram of an example of an equivalent circuit of a state where a finger is neither in contact with nor in proximity to the touch detection device illustrated in FIG. 2.
Figure 4:
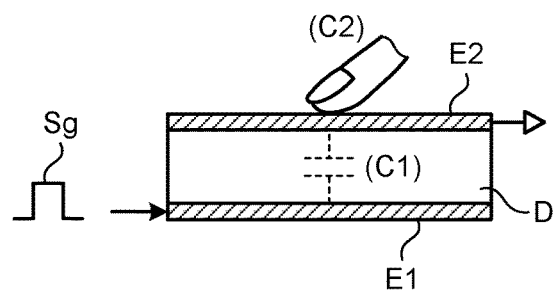
FIG. 4 is an explanatory diagram illustrating a state where a finger is in contact with or in proximity to the touch detection device for explaining the basic principle of capacitive touch detection.
Figure 5:
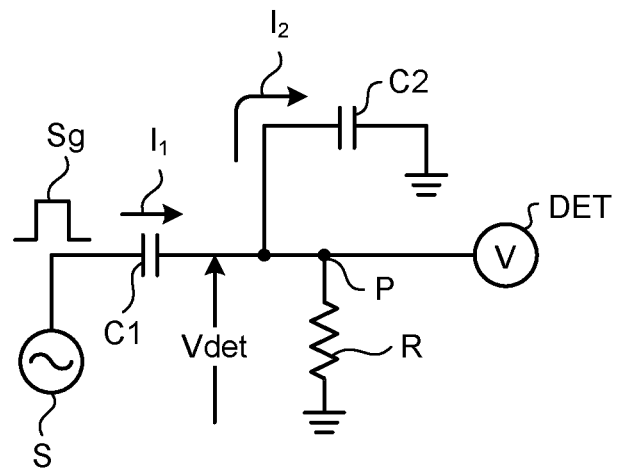
FIG. 5 is an explanatory diagram of an example of an equivalent circuit of the state where a finger is in contact with or in proximity to the touch detection device illustrated in FIG. 4.
Figure 6:
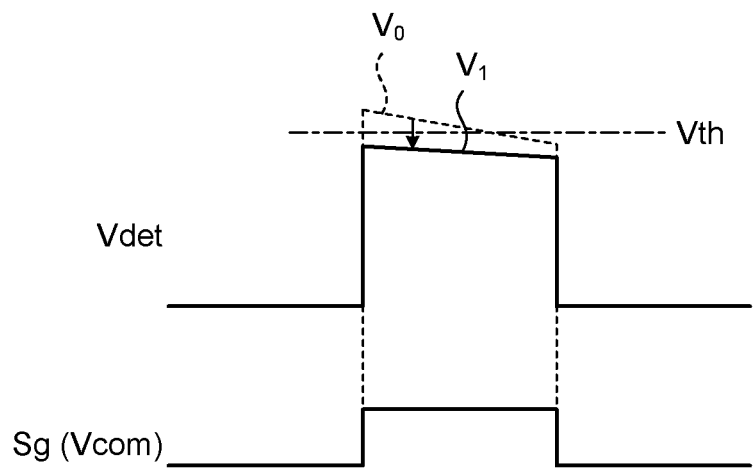
FIG. 6 is an example of waveforms of a drive signal and a touch detection signal.

The touch detection device 30 operates based on a basic principle of capacitive touch detection and outputs the touch detection signal Vdet. The basic principle of touch detection in the display device 1 with a touch detection function is explained with reference to FIGS. 1 to 6. FIG. 2 is an explanatory diagram illustrating a state where a finger is neither in contact with nor in proximity to the touch detection device 30 for explaining the basic principle of the capacitive touch detection. FIG. 3 is an explanatory diagram of an example of an equivalent circuit of a state where a finger is neither in contact with nor in proximity to the touch detection device 30 illustrated in FIG. 2. FIG. 4 is an explanatory diagram illustrating a state where a finger is in contact with or in proximity to the touch detection device 30 for explaining the basic principle of capacitive touch detection. FIG. 5 is an explanatory diagram of an example of an equivalent circuit of the state where a finger is in contact with or in proximity to the touch detection device 30 illustrated in FIG. 4. FIG. 6 is an example of waveforms of a drive signal and a touch detection signal.

For example, as illustrated in FIG. 2, a capacitive element C1 includes a pair of electrodes, that is, a drive electrode E1, and a touch detection electrode E2 placed to face each other across a dielectric material D. As illustrated in FIG. 3, one of ends of the capacitive element C1 is coupled to an AC signal source (a drive signal source) S and the other end P thereof is grounded via a resistor R and is coupled to a voltage detector (a touch detector) DET. The voltage detector DET is an integration circuit included in the amplifier 42 illustrated in FIG. 1, for example.

When an AC rectangular wave Sg of a predetermined frequency (about several kilohertz to hundreds of kilohertz, for example) is applied from the AC signal source S to the drive electrode E1 (one end of the capacitive element C1), an output waveform (the touch detection signal Vdet) appears via the voltage detector DET coupled to a side of the touch detection electrode E2 (the other end of the capacitive element C1). The AC rectangular wave Sg corresponds to the drive signal VcomAC.

In a state (a non-contact state) where a finger is not in contact with (or in proximity to) the touch detection device 30, a current $I_0$ corresponding to a capacitance value of the capacitive element C1 flows with charging to and discharging from the capacitive element C1 as illustrated in FIGS. 2 and 3. At that time, a potential waveform at the other end P of the capacitive element C1 is like, for example, a waveform $V_0$ illustrated in FIG. 6 and the voltage detector DET illustrated in FIG. 3 detects the waveform $V_0$.

On the other hand, in a state (a contact state) where a finger is in contact with (or in proximity to) the touch detection device 30, a capacitance formed by the finger acts like a capacitive element C2 added to the capacitive element C1 as illustrated in FIG. 4. In the equivalent circuit illustrated in FIG. 5, the capacitive element C2 is added in series with the capacitive element C1. In this state, currents $I_1$ and $I_2$ flow through the capacitive elements C1 and C2 with charging to and discharging from the capacitive elements C1 and C2, respectively. A potential waveform at the other end P of the capacitive element C1 is like, for example, a waveform $V_1$ illustrated in FIG. 6 and the voltage detector DET detects the waveform $V_1$. At that time, the potential of the other end P is a divided voltage potential determined by values of the currents $I_1$ and $I_2$ flowing through the capacitive elements C1 and C2, respectively. Accordingly, the waveform $V_1$ has a smaller value than the waveform $V_0$ in the non-contact state. The voltage detector DET compares the detected voltage with a predetermined threshold voltage Vth and determines the non-contact state when the detected voltage is equal to or higher than the threshold voltage Vth while determining the contact state when the detected voltage is lower than the threshold voltage Vth. The touch detection is achieved in this way.

The touch detection device 30 illustrated in FIG. 1 performs the touch detection by sequentially scanning detection blocks one by one according to a drive signal Vcom (the drive signal VcomAC) supplied from the drive electrode driver 14.

The touch detection device 30 outputs the touch detection signal Vdet with respect to each detection block from a plurality of touch detection electrodes TDL explained later via the voltage detector DET illustrated in FIG. 3 or 5, to supply the touch detection signal Vdet to the A/D converter 43 of the touch detection unit 40.

The A/D converter 43 is a circuit that samples each analog signal output from the amplifier 42 to convert the analog signal into a digital signal in the timing synchronized with the drive signal VcomAC.

The signal processor 44 includes a digital filter that reduces a frequency component (a noise component) of frequencies other than that at which the drive signal VcomAC is sampled, included in an output signal from the A/D converter 43. The signal processor 44 is a logic circuit that detects whether or not there is a touch to the touch detection device 30 based on the output signal from the A/D converter 43. The signal processor 44 compares the digitalized voltage detector DET with the predetermined threshold voltage Vth and determines a non-contact state of an external proximity object when the digitalized voltage detector DET is equal to or higher than the threshold voltage Vth. On the other hand, when the signal processor 44 compares the digitalized voltage detector DET with the predetermined threshold voltage Vth and the digitalized voltage detector DET is lower than the threshold voltage Vth, the signal processor 44 determines a contact state of an external proximity object. In this way, the touch detection unit 40 can perform the touch detection.

The coordinate extractor 45 is a logic circuit that obtains touch panel coordinates of a touch when the touch is detected by the signal processor 44. The detection timing controller 46 executes a control to cause the A/D converter 43, the signal processor 44, and the coordinate extractor 45 to operate synchronously with each other. The coordinate extractor 45 outputs the touch panel coordinates as a signal output Vout.

Figure 7:
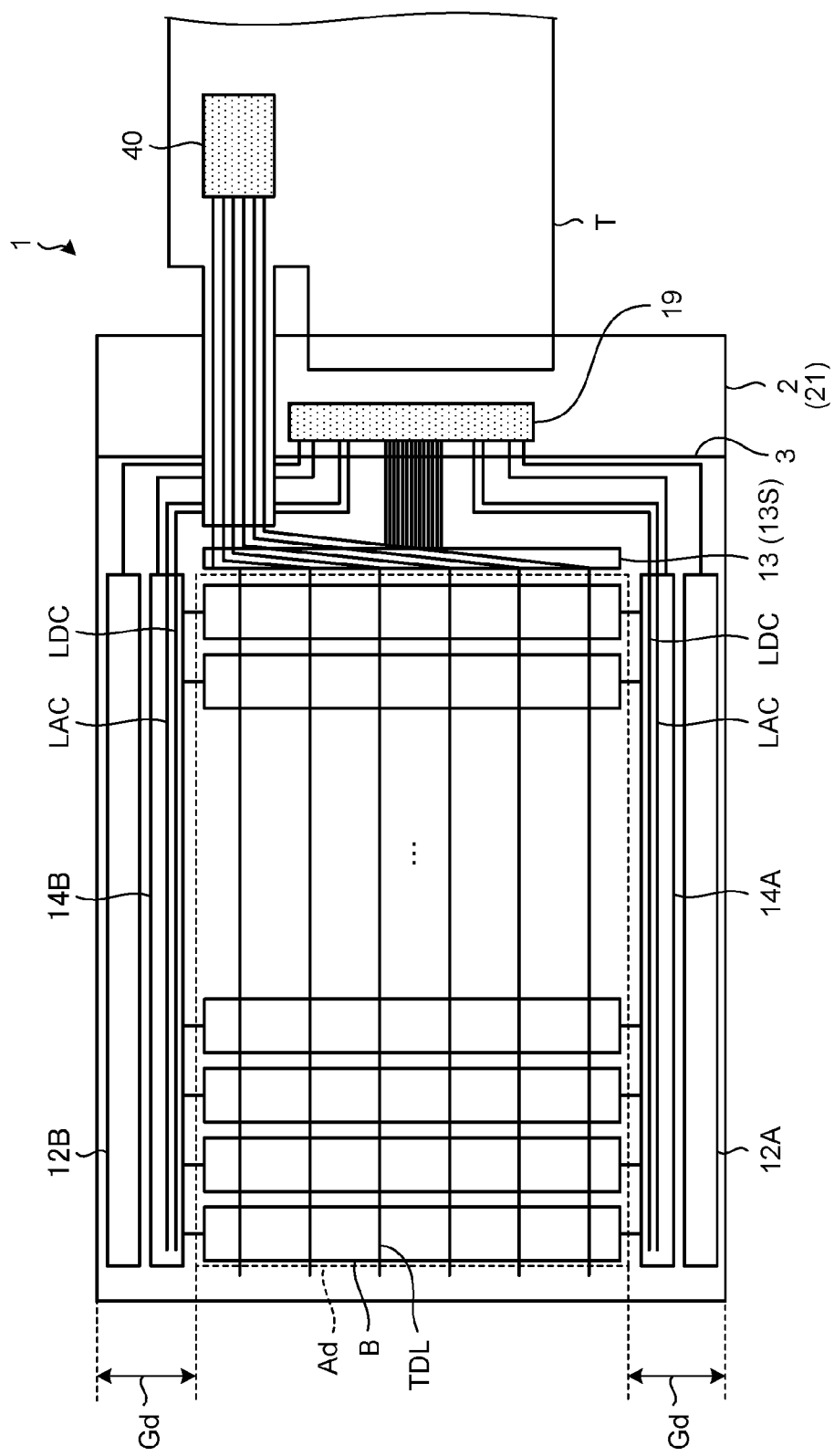
FIG. 7 is an example of a module on which the display unit with a touch detection function is mounted.

FIG. 7 is an example of a module on which a display unit with a touch detection function is mounted. As illustrated in FIG. 7, the display device 1 with a touch detection function includes a pixel substrate 2 (a thin film transistor (TFT) substrate 21) and a flexible printed circuit board T. On the pixel substrate 2 (the TFT substrate 21), a chip on glass (COG) 19 is mounted, and a display area Ad of the liquid-crystal display unit 20 and frame areas Gd are formed. The COG 19 is a chip of an IC driver mounted on the TFT substrate 21 and is a control device having circuits required for a display operation, such as the control unit 11 and the source driver 13 illustrated in FIG. 1, incorporated therein. In the present example, the source driver 13 and the source selector 13S are formed on the TFT substrate. The source driver 13 and the source selector 13S can be incorporated in the COG 19. Drive-electrode scanning units 14A and 14B, which are parts of the drive electrode driver 14, are formed on the TFT substrate 21. The gate driver 12 is formed as gate drivers 12A and 12B on the TFT substrate 21. In the display device 1 with a touch detection function, circuits such as the drive-electrode scanning units 14A and 14B and the gate driver 12 can be incorporated in the COG 19.

As illustrated in FIG. 7, drive electrode blocks B of a drive electrode COML and the touch detection electrodes TDL are formed to three-dimensionally intersect in a direction perpendicular to the front surface of the TFT substrate 21.

The drive electrode COML is divided into a plurality of stripe electrode patterns extending in one direction. When the touch detection operation is performed, the drive signal VcomAC is sequentially supplied to each of the electrode patterns by the drive electrode driver 14. Each of the drive electrode blocks B illustrated in FIG. 7 is stripe electrode patterns of the drive electrode COML to which the drive signal VcomAC is supplied at the same time. The drive electrode blocks B (the drive electrode COML) are arranged in a direction of the long side of the display unit 10 with a touch detection function and the touch detection electrodes TDL are arranged in a direction of the short side of the display unit 10 with a touch detection function. Outputs of the touch detection electrodes TDL are provided on the short side of the display unit 10 with a touch detection function and are coupled to the touch detection unit 40 mounted on the flexible printed circuit board T via the flexible printed circuit board T. As described above, the touch detection unit 40 is mounted on the flexible printed circuit board T and is coupled to each of the touch detection electrodes TDL arranged in parallel. The flexible printed circuit board T is not essential and it suffices to provide a terminal. In this case, the touch detection unit 40 is provided outside of the module.

A drive signal generator explained later is incorporated in the COG 19. The source selector 13S is formed of TFT elements near the display area Ad on the TFT substrate 21. Many pixels Pix are arrayed in a matrix in the display area Ad. The frame areas Gd and Gd are areas in which the pixels Pix are not arranged when the front surface of the TFT substrate 21 is viewed in a perpendicular direction thereto. The gate driver 12 and the drive-electrode scanning units 14A and 14B of the drive electrode driver 14 are arranged on the frame areas Gd and Gd.

The gate driver 12 includes the gate drivers 12A and 12B and is formed of TFT elements on the TFT substrate 21. The gate drivers 12A and 12B can drive sub-pixels SPix (pixels) arrayed in a matrix in the display area Ad from both sides of the display area Ad, respectively. In the following explanations, the gate driver 12A is also referred to as a first gate driver 12A and the gate driver 12B is also referred to as a second gate driver 12B. Scanning lines (not illustrated) are arranged between the first gate driver 12A and the second gate driver 12B. Accordingly, the scanning lines are provided to extend in a direction parallel to an extension direction of the drive electrode COML in a perpendicular direction to the front surface of the TFT substrate 21.

The drive-electrode scanning units 14A and 14B are formed of TFT elements on the TFT substrate 21. The drive-electrode scanning units 14A and 14B receive supply of the display drive voltage VcomDC via a display wiring LDC and supply of the drive signal VcomAC via a touch wiring LAC from the drive signal generator. The drive-electrode scanning units 14A and 14B can drive each of the drive electrode blocks B arranged in parallel from both sides thereof, respectively. The display wiring LDC that supplies the display drive voltage VcomDC and the touch wiring LAC that supplies the drive signal VcomAC are arranged in parallel in each of the frame areas Gd and Gd. The display wiring LDC is arranged on a side nearer to the display area Ad than the touch wiring LAC. This structure enables the display drive voltage VcomDC supplied by the display wiring LDC to stabilize potential states of ends of the display area Ad. Accordingly, display is stabilized particularly in a liquid-crystal displaying device using liquid crystals according to a lateral electric field mode.

The display device 1 with a touch detection function illustrated in FIG. 7 outputs the touch detection signal Vdet from the short side of the display unit 10 with a touch detection function. Accordingly, in the display unit 10 with a touch detection function, wirings can be easily laid during coupling to the touch detection unit 40 via the flexible printed circuit board T as a terminal unit.

The drive electrode COML functions as a drive electrode for the liquid-crystal display unit 20 and functions also as a drive electrode for the touch detection device 30.

Figure 8:
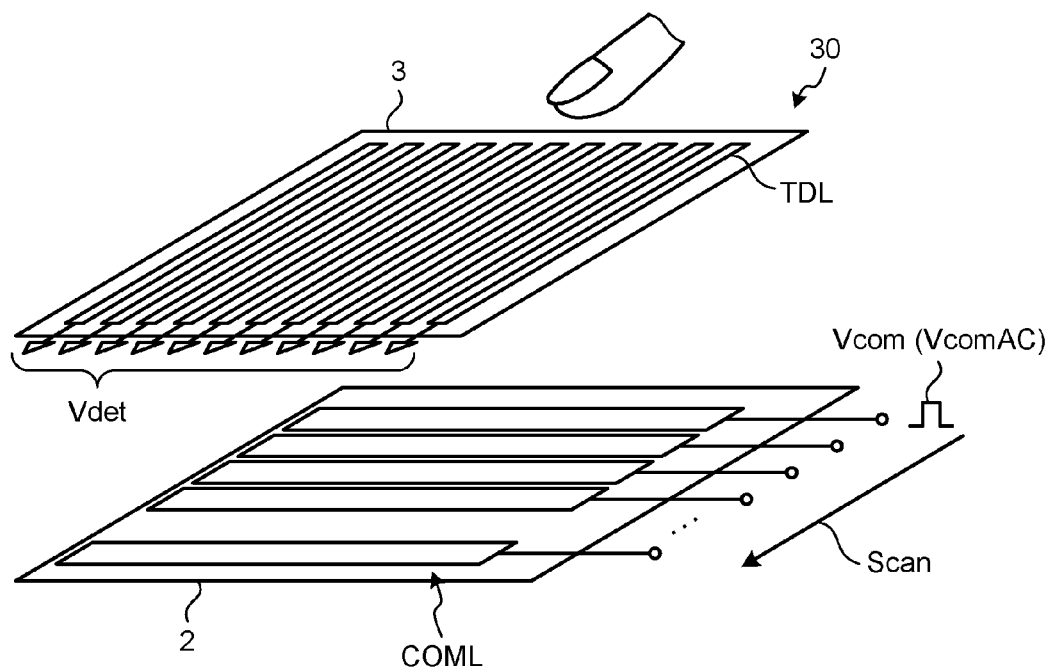
FIG. 8 is a perspective view of a configuration example of drive electrodes and touch detection electrodes of a display unit with a touch detection function.

FIG. 8 is a perspective view of a configuration example of drive electrodes and touch detection electrodes of a display unit with a touch detection function. The drive electrode COML illustrated in FIG. 8 faces a pixel electrode in a perpendicular direction to the front surface of the TFT substrate 21. The touch detection device 30 includes the drive electrode COML provided on the pixel substrate 2 and the touch detection electrodes TDL provided on a counter substrate 3. The touch detection electrodes TDL include stripe electrode patterns extending in a direction intersecting with the extension direction of the electrode patterns of the drive electrode COML. The touch detection electrodes TDL face the drive electrode COML in the perpendicular direction to the front surface of the TFT substrate 21. The electrode patterns of the touch detection electrodes TDL are coupled to inputs of the amplifier 42 of the touch detection unit 40, respectively. The electrode patterns of the drive electrode COML and the touch detection electrodes TDL intersecting with each other produce capacitances at intersections thereof, respectively. In the touch detection device 30, the drive electrode driver 14 applies the drive signal VcomAC to the drive electrode COML, so that the touch detection signal Vdet is output from the touch detection electrodes TDL, thereby performing the touch detection. That is, the drive electrode COML corresponds to the drive electrode E1 in the basic principle of the touch detection illustrated in FIGS. 2 to 6, the touch detection electrodes TDL correspond to the touch detection electrode E2, and the touch detection device 30 detects a touch according to the basic principle.

The touch detection electrodes TDL and the drive electrode COML (the drive electrode blocks) are not limited to that of a form divided into plural stripes. For example, the touch detection electrodes TDL or the drive electrode COML (the drive electrode blocks) can be that of a comb tine form. It suffices that the touch detection electrodes TDL and the drive electrode COML (the drive electrode blocks) are divided into plural pieces and shapes of slits dividing the drive electrode COML can be linear or curved.

As illustrated in FIG. 8, the electrode patterns intersecting with each other form a capacitive touch sensor in a matrix. Therefore, a position where a contact or proximity of an external proximity object occurs can be detected by scanning the entire touch detection surface of the touch detection device 30. That is, in the touch detection device 30, when the touch detection operation is performed, the drive electrode driver 14 is driven to perform line-sequential scanning of the drive electrode blocks B illustrated in FIG. 7 in a time divisional manner. In this way, each of the drive electrode blocks B (one detection block) of the drive electrode COML is sequentially selected in a scanning direction Scan. The touch detection device 30 then outputs the touch detection signal Vdet from each touch detection electrodes TDL. The touch detection device 30 thus performs the touch detection of one detection block.

3. Coupling Example Between Power Supply Circuit and Display Device

Figure 9:
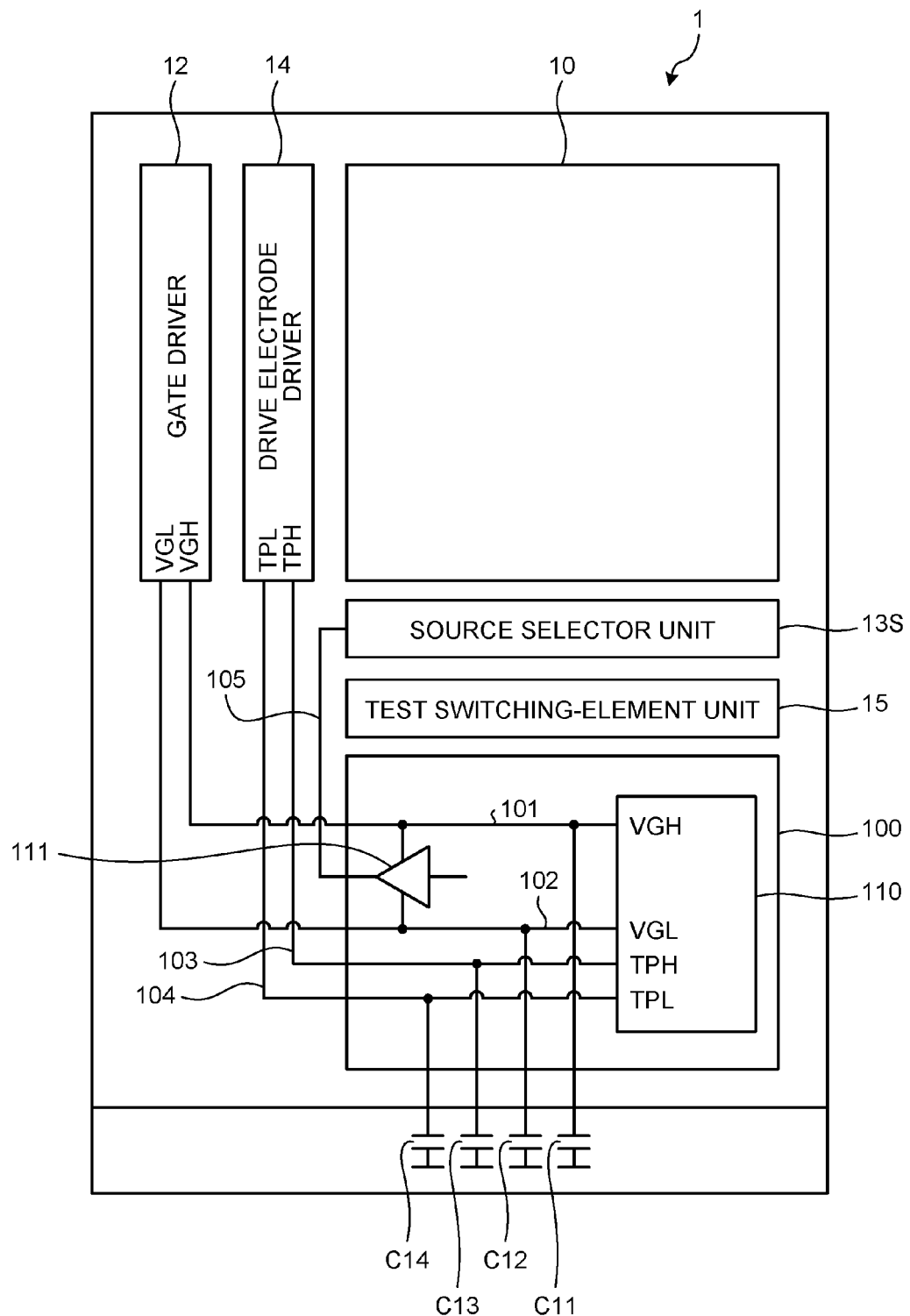
FIG. 9 is an example of coupling of a power supply circuit to constituent elements of the display device with a touch detection function.

FIG. 9 is an example of coupling of a power supply IC (Integrated Circuit) 100 to constituent elements of the display device 1 with a touch detection function. As illustrated in FIG. 9, the display device 1 with a touch detection function includes the display unit 10 with a touch detection function, the gate driver 12, the source selector 13S, the drive electrode driver 14 (the drive-electrode scanning units 14A and 14B), a test switching-element unit 15, the power supply IC 100, and smoothing capacitors C11, C12, C13, and C14. The test switching-element unit 15 includes a test switching element (not illustrated). The test switching element operates, that is, is turned ON/OFF to apply a test signal for checking an operation of the display section, for example, the display unit 10 with a touch detection function, to the display section. The test switching-element unit 15 is provided, for example, below the mounting position of the COG 19 illustrated in FIG. 7 but is not limited thereto.

A power supply circuit 110 is provided inside of the power supply IC 100. Wirings 101, 102, 103, and 104 are coupled to the power supply circuit 110. The power supply circuit 110 outputs power supply voltages VGH, VGL, TPH, and TPL to the wirings 101, 102, 103, and 104, respectively. The power supply circuit 110 supplies the power supply voltages VGH and VGL to the gate driver 12 to supply power to the display unit 10 with a touch detection function. The power supply circuit 110 supplies the power supply voltages TPH and TPL to the drive electrode driver 14 to supply power to the display unit 10 with a touch detection function.

A driver 111 is provided inside of the power supply IC 100. The driver 111 is coupled between the wirings 101 and 102. The driver 111 operates using the power supply voltage VGH output to the wiring 101 and the power supply voltage VGL output to the wiring 102 as a power supply. A wiring 105 is coupled to the driver 111. The driver 111 supplies a control signal to the source selector 13S via the wiring 105. Therefore, the power supply circuit 110 supplies the power supply voltage to the source selector 13S to supply power to the display unit 10 with a touch detection function.

The smoothing capacitors C11, C12, C13, and C14 are coupled to the wirings 101, 102, 103, and 104, respectively, on an output side of the power supply circuit 110. The smoothing capacitors C11, C12, C13, and C14 are provided to correspond to the wirings of the power supply circuit 110 and are inserted between the corresponding wirings and a ground level, respectively.

When the voltages supplied by the corresponding power supply wirings vary, the smoothing capacitors C11, C12, C13, and C14 perform charge and discharge operations, respectively. That is, the smoothing capacitors C11, C12, C13, and C14 are charged when the corresponding power supply voltages increase and are discharged when the corresponding power supply voltages decrease, respectively. Therefore, the smoothing capacitors C11, C12, C13, and C14 can suppress variations in the voltages of the corresponding wirings, respectively. The smoothing capacitors C11, C12, C13, and C14 can be provided on the TFT substrate 21 or the flexible printed circuit board T.

The display unit 10 with a touch detection function is a so-called "in-cell" device having the touch detection device 30 integrally incorporated in the liquid-crystal display unit 20, and a display operation period and a touch detection period are not executed at the same time but are present exclusively to avoid a noise influence.

The display operation period is a period in which display is performed on the liquid-crystal display unit 20 by sequentially scanning horizontal lines one by one according to the scanning signal Vscan supplied from the gate driver 12.

The touch detection period is a period in which the touch detection operation of supplying the drive signal Vcom for the touch detection from the drive electrode driver 14 to the drive electrode COML of the touch detection device 30 based on the control signal supplied from the control unit 11 to detect whether or not an external proximity object is in contact with or in proximity to the touch detection device 30 is performed.

The display operation period and the touch detection period are alternately and repeatedly executed. A repetition cycle of the display operation period is, for example, 60 hertz and the touch detection period has, for example, a repetition cycle several times higher than that of the display operation period. Therefore, depending on the repetition cycles of the display operation period and the touch detection period, the voltages applied to the smoothing capacitors C11, C12, C13, and C14 inserted between the wirings 101, 102, 103, and 104 of the power supply IC 100 and the ground level, respectively, periodically change and the smoothing capacitors C11, C12, C13, and C14 vibrate, which may be recognized by a user as the audible noise. The same holds for the case where the display unit 10 with a touch detection function is a so-called "on-cell" device. The on-cell device is a device having the touch detection device mounted on the liquid-crystal display unit.

4. Embodiment

The display device 1 with a touch detection function according to the present disclosure has a power consumption unit that consumes power during the touch detection period. Consumption of power by the power consumption unit during the touch detection period enables to reduce changes in the voltages applied to the smoothing capacitors C11, C12, C13, and C14 inserted between the wirings 101, 102, 103, and 104 of the power supply IC 100 and the ground level and to suppress or reduce the audible noise of the smoothing capacitors, respectively. In the following explanations, a potential higher than a predetermined threshold is also referred to as "H potential" and a potential lower than the predetermined threshold is also referred to as "L potential."

First Embodiment

Figure 10:
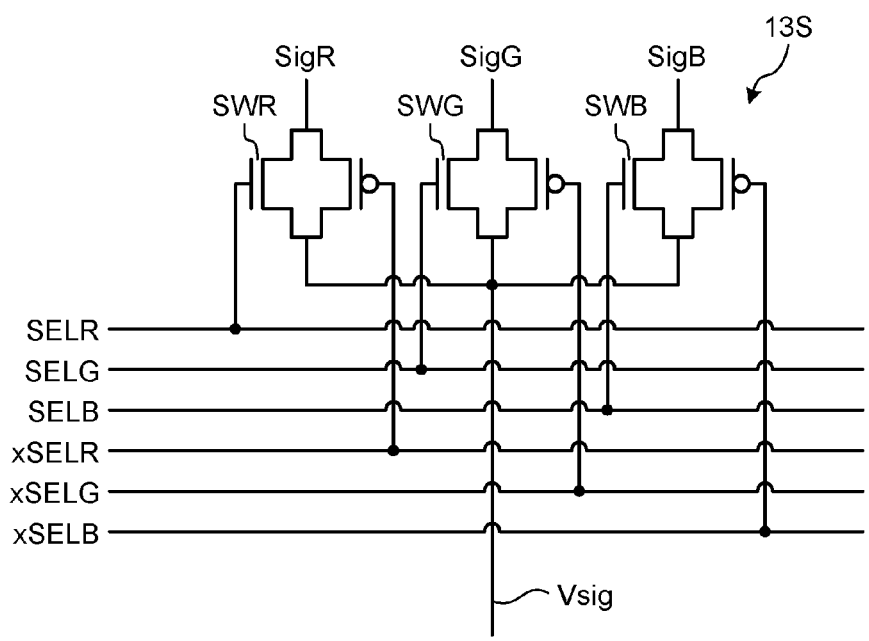
FIG. 10 is a configuration example of a power consumption unit according to a first embodiment.

FIG. 10 is a configuration example of a power consumption unit according to a first embodiment. In the first embodiment, the source selector 13S corresponds to the power consumption unit. In the first embodiment, the display section does not include the source selector 13S.

In FIG. 10, the source selector 13S includes switches SWR, SWG, and SWB provided to correspond to an R signal SigR, a G signal SigG, and a B signal SigB multiplexed into the video signal Vsig, respectively. Each of the switches SWR, SWG, and SWB is constituted by an Nch MOS transistor (hereinafter, also referred to as NMOSTr) and a Pch MOS transistor (hereinafter, also referred to as PMOSTr) having sources coupled to each other and drains coupled to each other.

Selection signals SELR, SELG, SELB, xSELR, xSELG, and xSELB are input to the source selector 13S. These selection signals SELR, SELG, SELB, xSELR, xSELG, and xSELB are included in the selection control signal Vsel. The selection signal xSELR is a signal obtained by inverting the selection signal SELR. For example, the selection signal SELR can be input to an inverter circuit and then the selection signal xSELR can be obtained as an output of the inverter circuit. The selection signal xSELG is a signal obtained by inverting the selection signal SELG. For example, the selection signal SELG can be input to an inverter circuit and then the selection signal xSELG can be obtained as an output of the inverter circuit. The selection signal xSELB is a signal obtained by inverting the selection signal SELB. For example, the selection signal SELB can be input to an inverter circuit and then the selection signal xSELB can be obtained as an output of the inverter circuit.

The selection signals SELR and xSELR are signals for selecting the R signal SigR. The selection signal SELR is input to a gate of the NMOSTr of the switch SWR. The selection signal xSELR is input to a gate of the PMOSTr of the switch SWR.

The selection signals SELG and xSELG are signals for selecting the G signal SigG. The selection signal SELG is input to a gate of the NMOSTr of the switch SWG. The selection signal xSELG is input to a gate of the PMOSTr of the switch SWG.

The selection signals SELB and xSELB are signals for selecting the B signal SigB. The selection signal SELB is input to a gate of the NMOSTr of the switch SWB. The selection signal xSELB is input to a gate of the PMOSTr of the switch SWB. A plurality of source selectors 13S can be provided for one display section.

The source selector 13S turns ON/OFF the switches SWR, SWG, and SWB to output the R signal SigR, the G signal SigG, and the B signal SigB, respectively, in the display operation period. Therefore, normally, the source selector 13S is not operated in the touch detection period, which is a period other than the display operation period.

In the first embodiment, the source selector 13S is operated also in the touch detection period to turn ON/OFF the switches SWR, SWG, and SWB and consume power. Specifically, power is consumed by charging and discharging parasitic capacitance components between the gate and source and between the gate and drain of each of the NMOSTr and the PMOSTr constituting the respective switches SWR, SWG, and SWB. When the parasitic capacitance component is C, the voltage applied to the gates of the NMOSTr and the PMOSTr is Vg, and the switching cycle between ON and OFF is f, the current i produced upon charging and discharging the parasitic capacitance component can be represented by an expression (1).

$$i = C \cdot Vg \cdot f \quad (1)$$

The amount of consumed power is proportional to the magnitude of the current i. Therefore, for example, the amount of power consumed by turning ON/OFF the switches SWR, SWG, and SWB can be adjusted by adjusting the switching cycle between ON and OFF. When the amount of power consumed by turning ON/OFF the switches SWR, SWG, and SWB is adjusted and the voltages applied to the smoothing capacitors C11 and C12 during the touch detection period are set substantially equal to those applied to the smoothing capacitors C11 and C12 during the display operation period, the audible noise of the smoothing capacitors C11 and C12 can be suppressed or reduced.

Specifically, the switching cycles between ON and OFF of the switches SWR, SWG, and SWB are adjusted such that power consumed by the units to which the wirings 101 and 102 supply power is substantially the same between the touch detection period and the display operation period. As a difference in the consumed power between the touch detection period and the display operation period is smaller, periodic changes in the voltages applied to the smoothing capacitors can be reduced more and the audible noise of the smoothing capacitors can be suppressed or reduced more. When the difference in the consumed power between the touch detection period and the display operation period is, for example, less than 30%, the periodic changes in the voltages applied to the smoothing capacitors can be reduced to such an extent that the audible noise of the smoothing capacitors can be suppressed or reduced.

First Operation Example of First Embodiment

Figure 11:
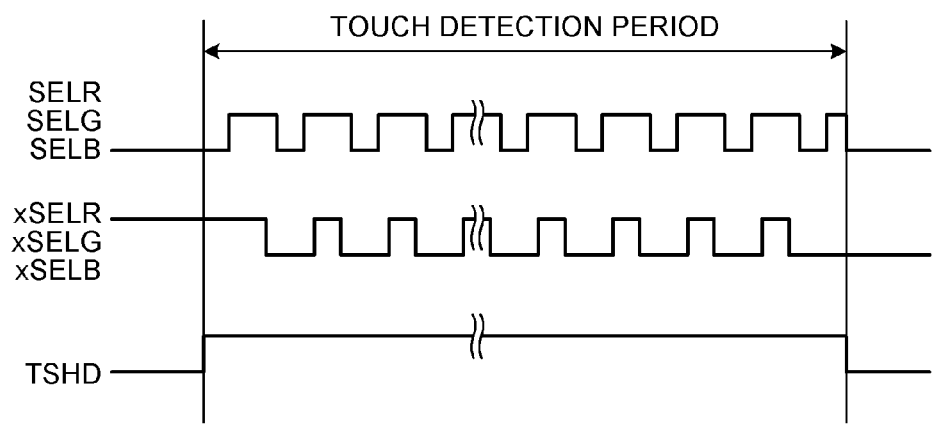
FIG. 11 is a waveform chart representing a first operation example of the first embodiment.

FIG. 11 is a waveform chart representing a first operation example of the configuration illustrated in FIG. 10. In FIG. 11, a signal TSHD is a signal having an H potential in the touch detection period. In the period in which the signal TSHD has the H potential, that is, in the touch detection period, the NMOSTrs of the switches SWR, SWG, and SWB are turned ON during periods in which the selection signals SELR, SELG, and SELB have H potentials, respectively, while the NMOSTrs of the switches SWR, SWG, and SWB are turned OFF during periods in which the selection signals SELR, SELG, and SELB have L potentials, respectively. The PMOSTrs of the switches SWR, SWG, and SWB are turned ON during periods in which the selection signals xSELR, xSELG, and xSELB have L potentials, respectively, while the PMOSTrs of the switches SWR, SWG, and SWB are turned OFF during periods in which the selection signals xSELR, xSELG, and xSELB have H potentials, respectively. The consumed power in the touch detection period can be increased by controlling ON/OFF of the switches SWR, SWG, and SWB in this way.

With reference to FIG. 11, it is indicated that the selection signals xSELR, xSELG, and xSELB have the L potentials and the PMOSTrs of the switches SWR, SWG, and SWB are ON during the periods in which the selection signals SELR, SELG, and SELB have the L potentials and the NMOSTrs of the switches SWR, SWG, and SWB are OFF. On the other hand, the selection signals SELR, SELG, and SELB have the H potentials and the NMOSTrs of the switches SWR, SWG, and SWB are ON during the periods in which the selection signals xSELR, xSELG, and xSELB have the H potentials and the PMOSTrs of the switches SWR, SWG, and SWB are OFF.

Accordingly, in the touch detection period, a state where at least either the NMOSTrs or the PMOSTrs are ON is maintained. That is, the NMOSTrs and the PMOSTrs are controlled to be ON/OFF in predetermined cycles, respectively, to bring at least either the NMOSTrs or the PMOSTrs into the ON state in any timing of the touch detection period.

Because at least either the NMOSTrs or the PMOSTrs are brought into the ON state in any timing of the touch detection period, the R signal SigR, the G signal SigG, and the B signal SigB are fixed and a state where the video signal Vsig is coupled to the ground (grounded) is maintained, thereby preventing floating states of the R signal SigR, the G signal SigG, and the B signal SigB.

As described above, in the first embodiment, the source selector 13S that is normally provided to perform the selection operation during the display operation period is operated to function as the power consumption unit also in the period other than the display operation period. In this way, the consumed power in the touch detection period can be set to be equal or close to the consumed power in the display operation period, so that the periodic changes in the voltages applied to the smoothing capacitors can be reduced and the audible noise of the smoothing capacitors can be suppressed or reduced.

In the first embodiment, the source selector 13S to be used for display control is caused to function as the power consumption unit, and therefore it is not necessary to add a new member to suppress or reduce the audible noise of the smoothing capacitors. Furthermore, because the power consumption of the source selector 13S can be adjusted by changing the cycle at which the switches SWR, SWG, and SWB of the source selector 13S are switched, the first embodiment can be easily applied to various display devices.

Second Operation Example of First Embodiment

When the transistors that constitute each of the switches SWR, SWG, and SWB of the source selector 13S are operated to be ON/OFF, noise into the display section can be suppressed or reduced by setting the selection signals to match the timing when one transistor transitions from ON to OFF with the timing when another transistor transitions from OFF to ON, respectively.

Figure 12:
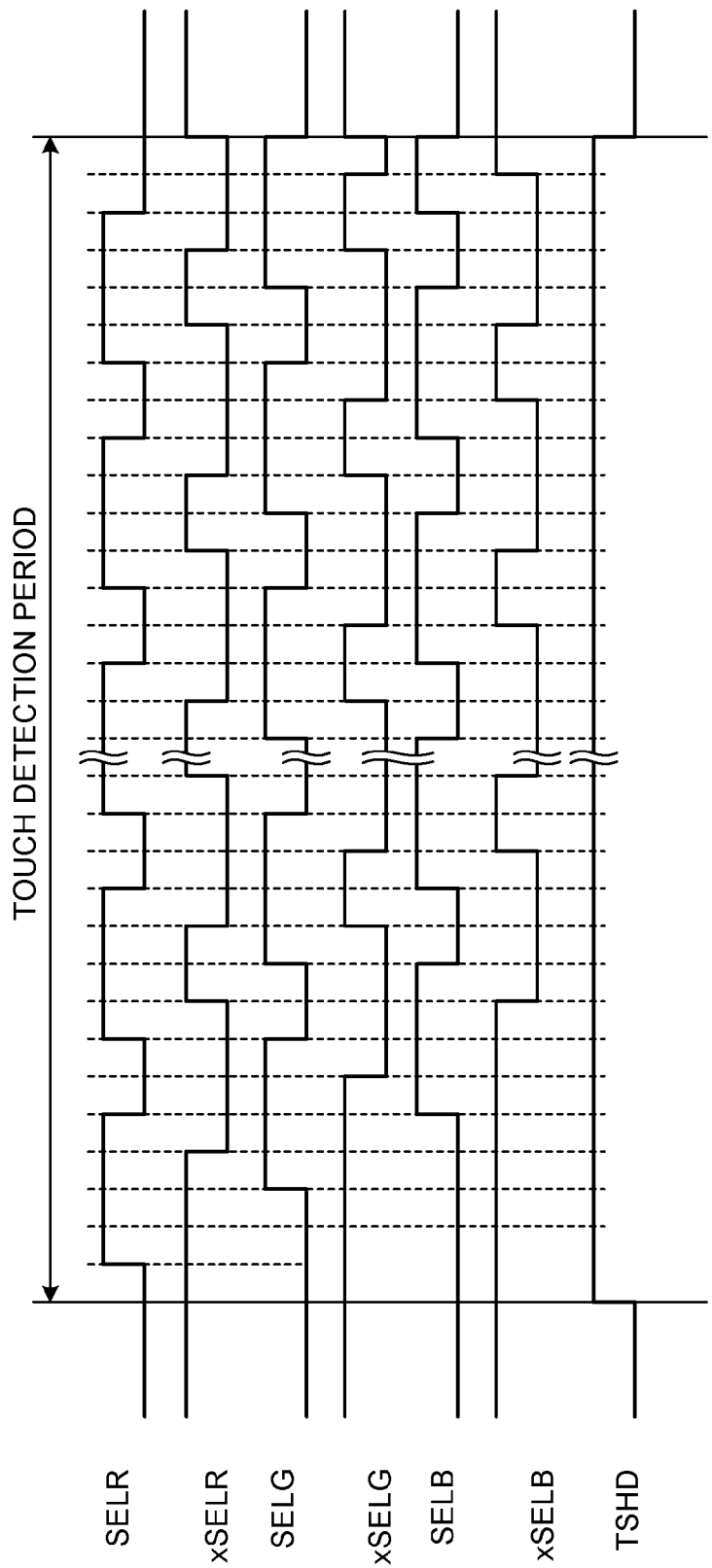
FIG. 12 is a waveform chart representing a second operation example of the first embodiment.

For example, in the touch detection period, by setting the selection signals as illustrated in FIG. 12, the timings of transitions from OFF to ON are matched with the timings of transitions from ON to OFF with respect to transistors constituting the switches SWR, SWG, and SWB. For example, timings of a change of the selection signal SELB from the L potential to the H potential match with timings of a change of the selection signal SELR from the H potential to the L potential, respectively, and timings of a transition of the NMOSTr of the switch SWB from OFF to ON match with timings of a transition of the NMOSTr of the switch SWR from ON to OFF, respectively. Timings of a change of the selection signal xSELG from the L potential to the H potential match with timings of a change of the selection signal xSELR from the H potential to the L potential, respectively, and timings of a transition of the PMOSTr of the switch SWG from ON to OFF match with timings of a transition of the PMOSTr of the switch SWR from OFF to ON, respectively.

One of the source and drain of each of all the NMOSTrs and the PMOSTrs included in the switches SWR, SWG, and SWB is coupled to a signal line coupled to the display section and the other of the source and drain of each of the NMOSTrs and the PMOSTrs is coupled to a signal line provided in common for all the NMOSTrs and the PMOSTrs. Furthermore, the control is executed to match the timing of a transition of any one of transistor elements of the NMOSTrs and the PMOSTrs included in the switches SWR, SWG, and SWB from OFF to ON with the timing of a transition of another one of the transistor elements of the NMOSTrs and the PMOSTrs included in the switches SWR, SWG, and SWB from ON to OFF, respectively.

In this way, noise in the display section can be suppressed or reduced by setting the selection signals to match the timing of a transition of one of the transistors constituting the switches SWR, SWG, and SWB in the source selector 13S from ON to OFF with the timing of a transition of another one of the transistors from OFF to ON.

As explained with reference to FIG. 10, the video signal Vsig is input to the source selector 13S via the signal line provided in common for the switches SWR, SWG, and SWB. Accordingly, when a transistor transitions from OFF to ON or from ON to OFF in an arbitrary timing, the parasitic capacitance components between the gate and source and between the gate and drain of the PMOSTr or the NMOSTr are charged and discharged. When the parasitic capacitance components are charged and discharged, a current flows and a variation in the voltage occurs in the signal line provided in common to input the video signal Vsig to the display section. The variation in the voltage may appear as noise in the display section. Therefore, the source driver 13 that generates the selection control signal Vsel sets the selection signals to match the timing of a transition of one transistor from OFF to ON with the timing of a transition of another transistor from ON to OFF, as in the second operation example, thereby canceling the change in the voltage. When the transition timings are matched in this way, noise can be suppressed or reduced more than in a case where the transition timings are not matched.

To achieve waveforms illustrated in FIG. 12, it suffices, for example, to prepare a selection signal as a base and to create a selection signal delayed from the base selection signal by a third of the cycle and a selection signal delayed from the base selection signal by two thirds of the cycle.

When phase differences of the three selection signals are set to thirds of the cycle, respectively, the three selection signals SELR, SELG, and SELB having phases equally shifted by thirds of the cycle, respectively, can be obtained.

While the phases are shifted by thirds of the cycle, respectively, because three colors of RGB are used in the second operation example, it suffices to create a selection signal delayed from the base selection signal by a fourth of the cycle, a selection signal delayed by two fourths of the cycle, and a selection signal delayed by three fourths of the cycle when four colors of RGBW including white in addition to RGB are used. By setting phase differences of the four selection signals to fourths of the cycle, respectively, four selection signals having phases equally shifted by fourths of the cycles, respectively, can be obtained.

When the transistors constituting the switches SWR, SWG, and SWB of the source selector 13S are operated as in the second operation example, power consumption in the touch detection period can be set to be equal to or close to that in the display operation period while noise in the display section is suppressed or reduced. Accordingly, periodic changes of the voltages applied to the smoothing capacitors can be reduced and the audible noise of the smoothing capacitors can be suppressed or reduced.

Third Operation Example of First Embodiment

Alternatively, it is possible to operate some of the switches SWR, SWG, and SWB of the source selector 13S to be tuned ON and OFF and the others to keep ON states thereof when the source selector 13S is caused to function as the power consumption unit also in the period other than the display operation period. When the switches are operated to be turned ON and OFF, power is consumed by charging and discharging the parasitic capacitance components mentioned above. Accordingly, the amount of power consumption can be adjusted by adjusting a ratio between the number of switches to keep the ON states thereof and the number of switches to be turned ON and OFF.

Figure 13:
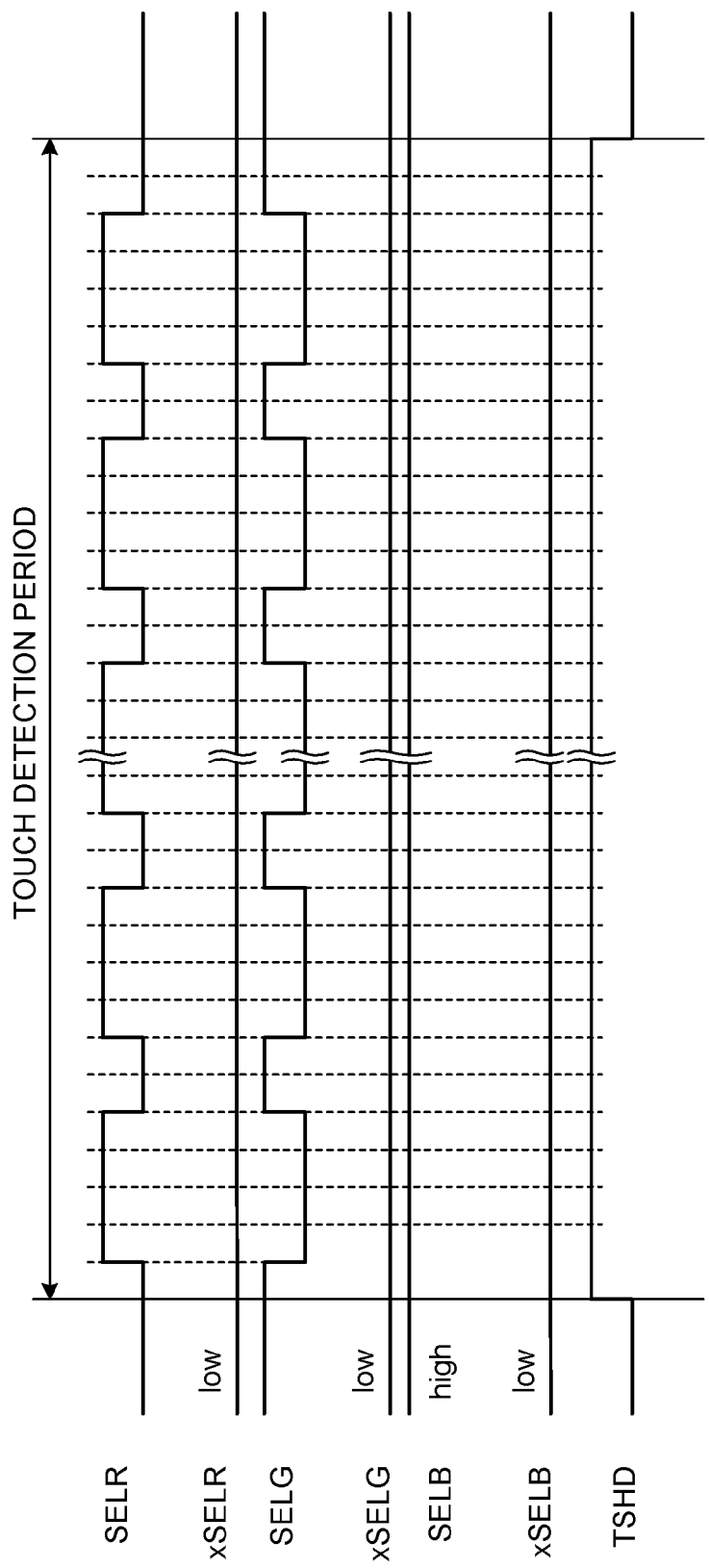
FIG. 13 is a waveform chart representing a third operation example of the first embodiment.

FIG. 13 is a waveform chart representing a third operation example of the first embodiment. For example, as illustrated in FIG. 13, the selection signal SELR and the selection signal SELG have reverse phases and timings of a change of one of the selection signals from the L potential to the H potential match with timings of a change of the other selection signal from the H potential to the L potential, respectively, in the touch detection period. Accordingly, in the touch detection period, timings of a transition of the NMOSTr of the switch SWR from OFF to ON match with timings of a transition of the NMOSTr of the switch SWG from ON to OFF, respectively, and timings of a transition of the NMOSTr of the switch SWG from OFF to ON match timings of a transition of the NMOSTr of the switch SWR from ON to OFF, respectively.

Meanwhile, the selection signals xSELR, xSELG, and xSELB have the L potentials, respectively, the selection signal SELB has the H potential, and the PMOSTrs of the switches SWR, SWG, and SWB and the NMOSTr of the switch SWB are kept in the ON states, respectively.

In this way, when some of the switches constituting the source selector 13S are operated to be turned ON and OFF and the other switches are kept in the ON states, the amount of consumed power can be adjusted. In the third operation example, the amount of consumed power is one third of that in the second operation example. The amount of consumed power can be finely adjusted by adjusting ON periods and OFF periods of the switches that are operated to be turned ON and OFF.

When some of switches constituting the source selector 13S are operated to be turned ON and OFF, the selection signals are set to match the timing of a transition of one transistor from ON to OFF with the timing of a transition of another transistor from OFF to ON, and thereby the power consumption in the touch detection period can be set to be equal to or close to that in the display operation period while noise is suppressed or reduced as in the second operation example. Accordingly, the periodic changes of the voltages applied to the smoothing capacitors can be reduced and the audible noise of the smoothing capacitors can be suppressed or reduced.

Second Embodiment

Figure 14:
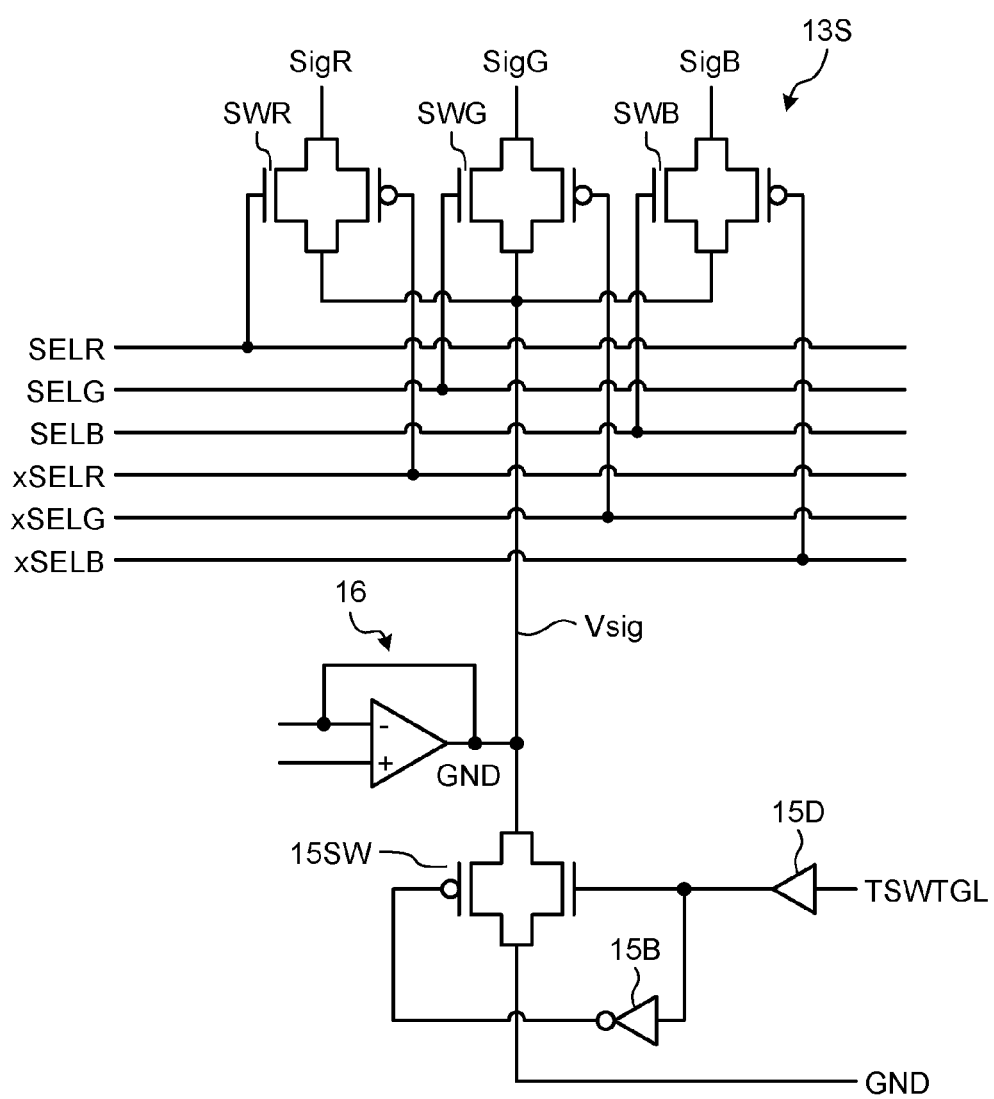
FIG. 14 is a configuration example of a power consumption unit according to a second embodiment.

FIG. 14 is a configuration example of a power consumption unit according to a second embodiment. In the second embodiment, a test switching element 15SW corresponds to the power consumption unit. In the second embodiment, a buffer 16 that outputs a signal of a ground level is used during the touch detection period. The buffer 16 functions as a signal application unit that applies, for example, the signal of the ground level in the touch detection period to a wiring that transmits the video signal Vsig to the source selector 13S. In FIG. 14, the signal of the ground level output from the buffer 16 is applied in the touch detection period to the wiring that transmits the video signal Vsig to the source selector 13S. Accordingly, a voltage of a pixel signal line provided in the display section that is coupled to the output side of the source selector 13S is set to the ground level in the touch detection period.

The test switching element 15SW is operated to apply a test signal to the display section when a test for checking the operation of the display section is performed. Generally, the operation of the display section is checked before an end product is completed. Checking of the operation of the display section is performed, for example, before the COG 19 is formed on the pixel substrate 2 but is not limited thereto. When the operation of the display section is to be checked, the test switching element 15SW is brought into an ON state and the test signal from an evaluation board is applied to the test switching element 15SW, so that the test signal is applied to the display section via the test switching element 15SW and the source selector 13S. By applying the test signal to the display section, the operation of the display section is checked.

Figure 15:
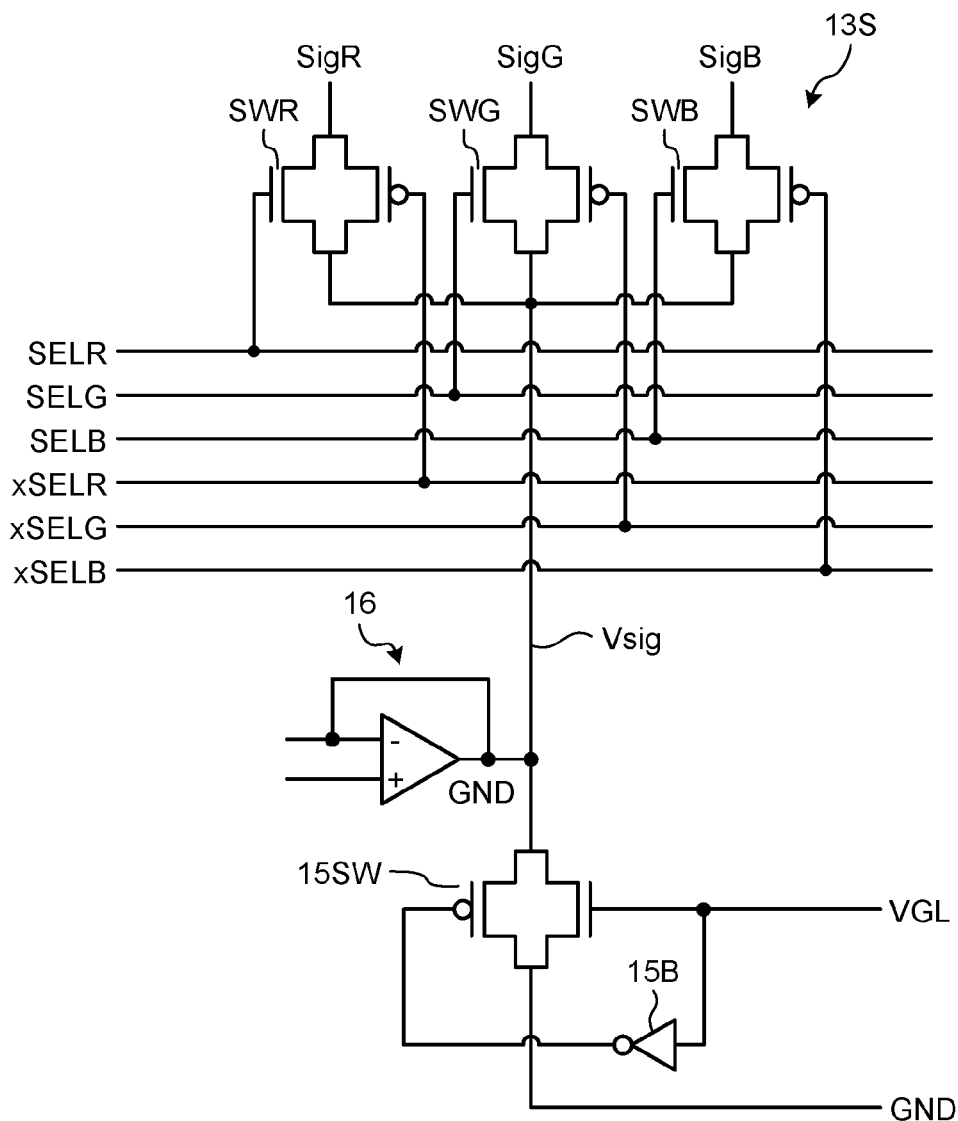
FIG. 15 is a comparative example to the second embodiment.

After the operation of the display section is checked, the test switching element 15SW is normally kept in an OFF state. For example, as in FIG. 15, which illustrates a comparative example to the second embodiment, the power supply voltage VGL is applied to a gate of an NMOSTr of the test switching element 15SW and a voltage obtained by inverting the power supply voltage VGL with an inverter 15B is applied to a gate of a PMOSTr of the test switching element 15SW. Accordingly, the test switching element 15SW is kept in the OFF state and the test switching element 15SW is never used for some purposes from then.

On the other hand, in the second embodiment, the test switching element 15SW that is normally not used after checking of the operation of the display section is finished is operated in the touch detection period to consume power. That is, because the test switching element 15SW that is normally not used is caused to function as the power consumption unit in the second embodiment, it is not necessary to add a new element or circuit to suppress or reduce the audible noise of the smoothing capacitors.

Referring back to FIG. 14, the selection signals SELR, SELG, and SELB are all fixed to H potentials and the selection signals xSELR, xSELG, and xSELB are all fixed to L potentials, respectively, in the touch detection period. Accordingly, the NMOSTrs and the PMOSTrs of the switches SWR, SWG, and SWB constituting the source selector 13S are all in ON states, respectively, in the touch detection period. In the touch detection period, the signal of the ground level is applied from the buffer 16 to the wiring that transmits the video signal Vsig and the voltage of the pixel signal line provided in the display section is set to the ground level.

The test switching element 15SW has the NMOSTr and the PMOSTr. An output of a buffer 15D is applied directly to the NMOSTr and the output of the buffer 15D inverted by the inverter 15B is applied to the PMOSTr. A toggle signal TSWTGL that has an H potential and an L potential repeating in a predetermined cycle is input to the buffer 15D and thus the test switching element 15SW repeats an ON/OFF operation according to the output of the buffer 15D.

Figure 16:
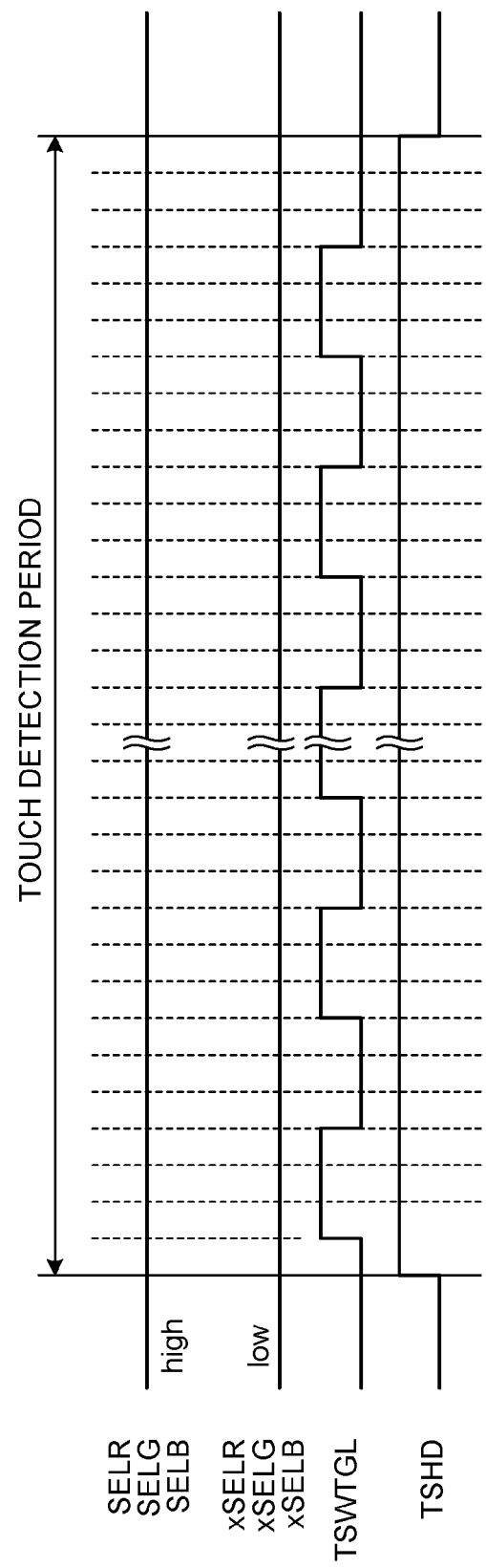
FIG. 16 is a waveform chart representing an example of an operation of the second embodiment.

FIG. 16 is a waveform chart representing an example of an operation of the second embodiment. For example, in the touch detection period, the test switching element 15SW is in an ON state when the toggle signal TSWTGL has the H potential and is in an OFF state when the toggle signal TSWTGL has the L potential, as illustrated in FIG. 16. The test switching element 15SW functions as the power consumption unit that consumes power.

Figure 17:
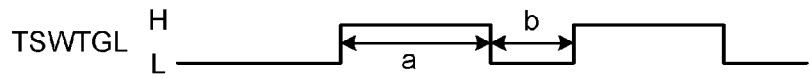
FIG. 17 is a waveform chart representing an example of the operation of the second embodiment.

In the example illustrated in FIG. 16, the toggle signal TSWTGL has periods of the H potential and periods of the L potential on a one-to-one basis. Regarding the toggle signal TSWTGL, as the number of changes from the H potential to the L potential and from the L potential to the H potential increases, that is, the cycle of voltage changes is shorter, the amount of power consumed by the test switching element 15SW becomes larger. In other words, the amount of power consumed by the test switching element 15SW can be adjusted by adjusting the length of a period "a" of the H potential of the toggle signal TSWTGL and the length of a period "b" of the L potential thereof illustrated in FIG. 17 to adjust the cycle (that is, a frequency) of changes in the potential of the toggle signal TSWTGL.

In the touch detection period, the signal of the ground level is applied from the buffer 16 to the wiring that transmits the video signal Vsig. Accordingly, even when the test switching element 15SW repeats the ON/OFF operation, a voltage value of a signal line between the test switching element 15SW and the display section can be kept constant and noise occurring to the source selector 13S and the display section is very small. A plurality of source selectors 13S, test switching elements 15SW, and buffers 16 can be provided for one display section.

The signal applied from the buffer 16 to the wiring that transmits the video signal Vsig in the touch detection period is not limited to the signal of the ground level. For example, a signal of any fixed potential other than the ground level can be applied from the buffer 16 to the wiring that transmits the video signal Vsig. By setting a state of the wiring coupled to the input terminal of the test switching element 15SW to a state in which the fixed potential of the same level is applied thereto, a floating state, or a state where high impedance is prevented, the voltage of a pixel signal line provided in the display section that is coupled to the output side of the source selector 13S is set to the fixed potential other than the ground level in the touch detection period. In any of these cases, the voltage value of the signal line between the test switching element 15SW and the display section can be kept constant. Therefore, noise occurring to the source selector 13S and the display section is very small.

Figure 18:
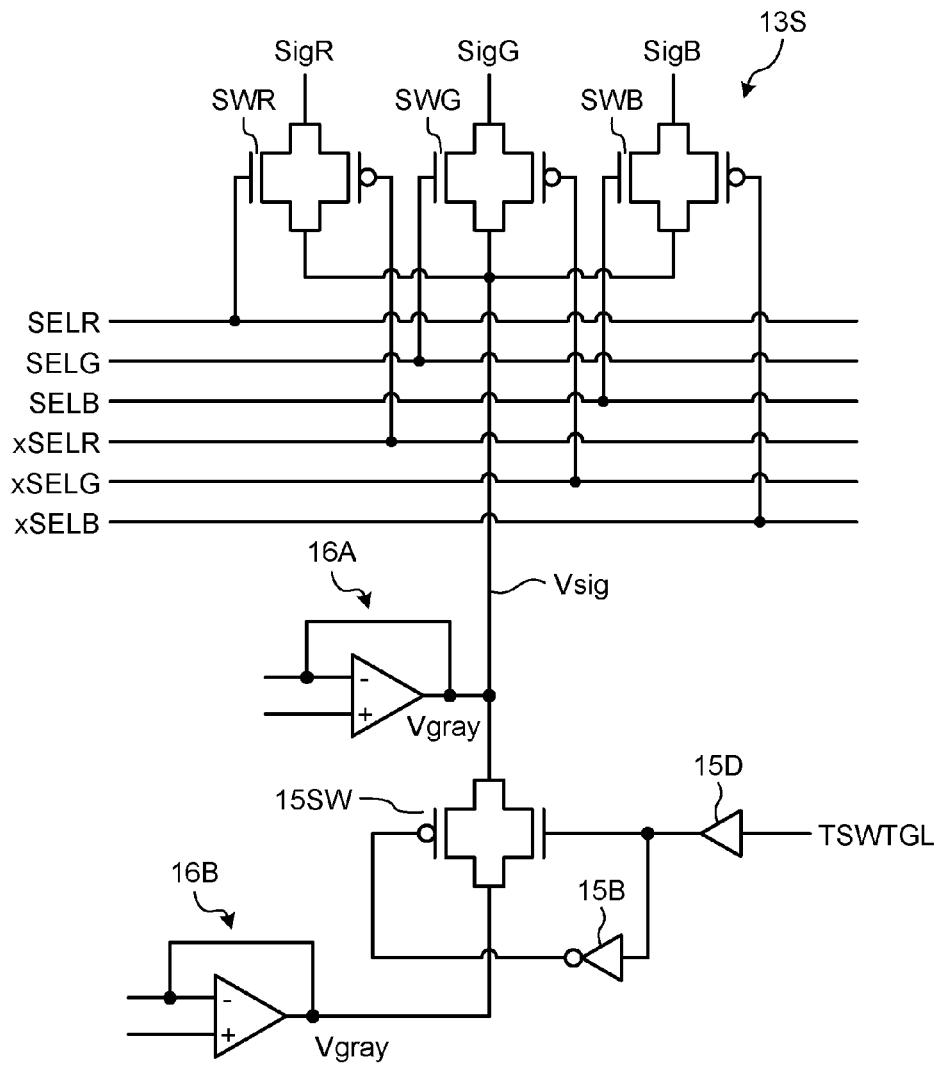
FIG. 18 is a diagram illustrating a first modification of the second embodiment.
Figure 19:
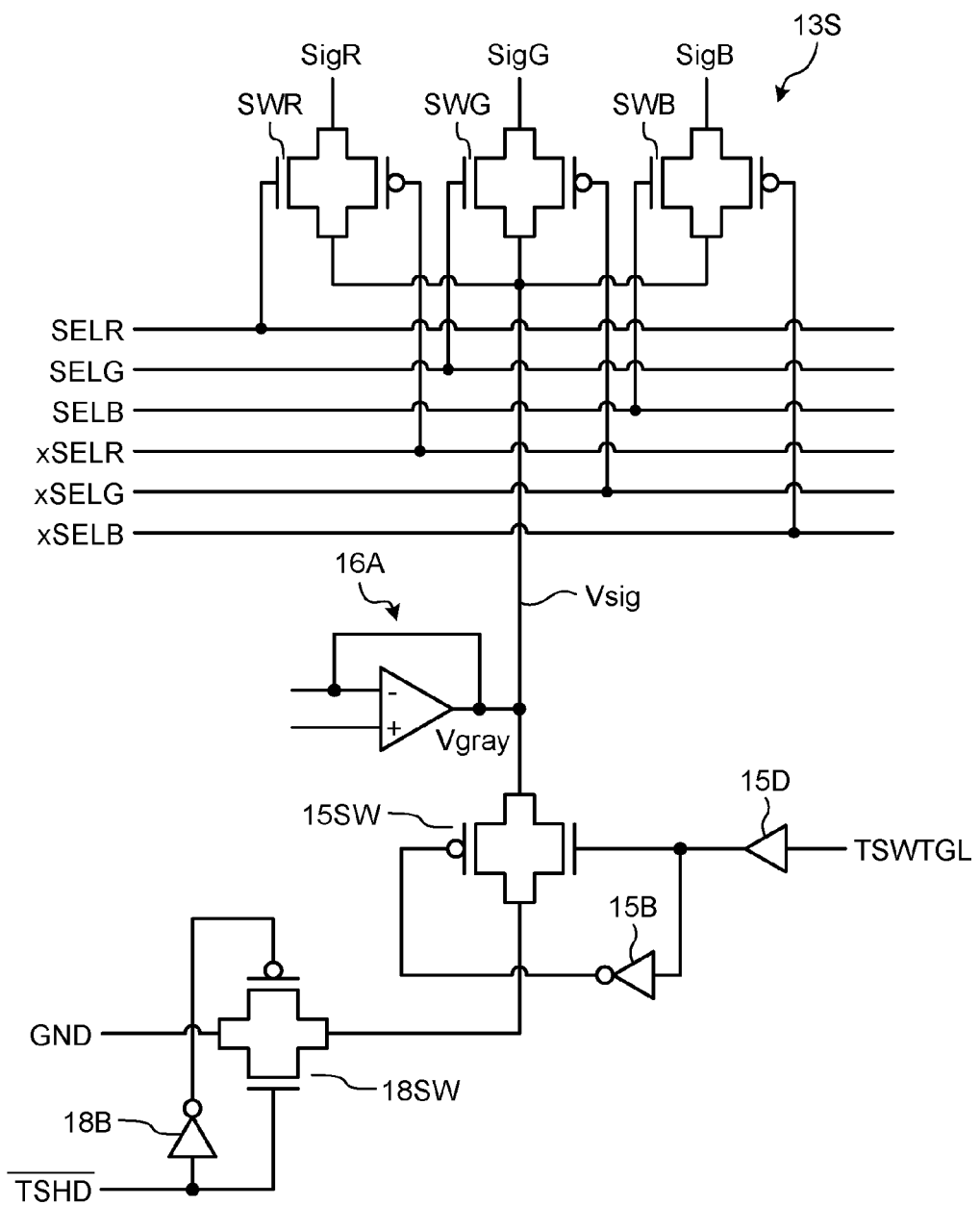
FIG. 19 is a diagram illustrating a second modification of the second embodiment.
Figure 20:
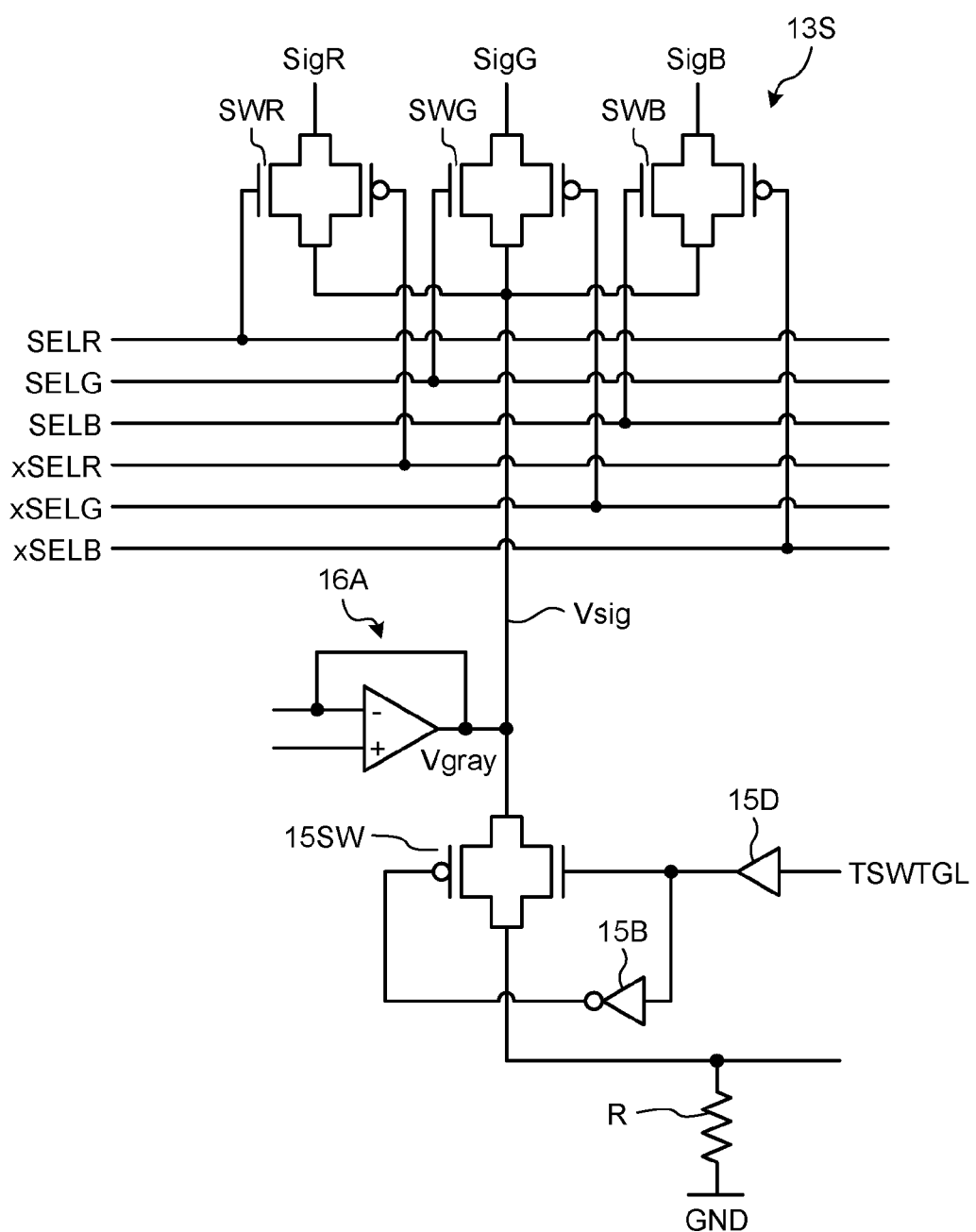
FIG. 20 is a diagram illustrating a third modification of the second embodiment.

FIGS. 18 to 20 are diagrams illustrating modifications of the second embodiment in a case where a fixed potential other than a ground level is applied to a wiring that transmits the video signal Vsig in a touch detection period.

FIG. 18 is a diagram illustrating a first modification of the second embodiment. As illustrated in FIG. 18, a potential applied from a buffer 16B to the wiring that transmits the video signal Vsig via the test switching element 15SW is, for example, a fixed potential Vgray. A potential applied from a buffer 16A to the wiring that transmits the video signal Vsig in the touch detection period is also the fixed potential Vgray. In a state where the same potentials Vgray are applied in this way, power is consumed without affecting the source selector 13S and the display section even when the test switching element 15SW repeats the ON/OFF operation according to the toggle signal TSWTGL, and thus the audible noise of the smoothing capacitors can be suppressed or reduced.

A plurality of source selectors 13S, test switching elements 15SW, and buffers 16A can be provided for one display section. In this case, fixed potentials applied from the respective buffers 16A to the wiring that transmits the video signal Vsig can be different values. For example, a positive fixed potential +Vgray and a negative fixed potential −Vgray can be applied, respectively.

FIG. 19 is a diagram illustrating a second modification of the second embodiment. As illustrated in FIG. 19, a signal obtained by inverting the signal TSHD is applied to a gate of an NMOSTr of a switching element 18SW and a signal obtained by inverting the signal obtained by inverting the signal TSHD with an inverter 18B is applied to a gate of a PMOSTr of the switching element 18SW. The switching element 18SW is kept in an OFF state in the touch detection period in which the signal TSHD has the H potential, that is, in the period in which the test switching element 15SW repeats the ON/OFF operation according to the toggle signal TSWTGL. This configuration brings a wiring between the test switching element 15SW and the switching element 18SW into a floating state. In this floating state, the fixed potential Vgray is applied from the buffer 16A to the wiring that transmits the video signal Vsig in the touch detection period. Accordingly, even when the test switching element 15SW repeats the ON/OFF operation according to the toggle signal TSWTGL, the voltage value of the signal line between the test switching element 15SW and the display section can be kept constant. Therefore, power can be consumed and the audible noise of the smoothing capacitors can be suppressed or reduced without affecting the source selector 13S and the display section.

In a period in which the signal TSHD has the L potential, it is desirable to keep the switching element 18SW in an ON state and to set the wiring between the test switching element 15SW and the switching element 18SW to the ground level.

A plurality of source selectors 13S, test switching elements 15SW, and buffers 16A can be provided for one display section. In such a case, fixed potentials applied from the respective buffers 16A to the wiring that transmits the video signal Vsig can be different values, respectively. For example, a positive fixed potential +Vgray and a negative fixed potential −Vgray can be applied, respectively.

FIG. 20 is a diagram illustrating a first modification of the third embodiment. The wiring coupled to the input terminal of the test switching element 15SW is possibly in a high resistance state. As illustrated in FIG. 20, sources of the NMOSTr and the PMOSTr constituting the test switching element 15SW are coupled to the ground level via a resistor R. With this coupling state, it is possible to prevent the wiring coupled to the input terminal of the test switching element 15SW from being in a high resistance state.

In this coupling state, the fixed potential Vgray is applied from the buffer 16A to the wiring that transmits the video signal Vsig in the touch detection period. In the state where the fixed potential Vgray is applied, even when the test switching element 15SW repeats the ON/OFF operation according to the toggle signal TSWTGL, the voltage value of the signal line between the test switching element 15SW and the display section can be kept constant. Accordingly, power can be consumed and the audible noise of the smoothing capacitors can be suppressed or reduced without affecting the source selector 13S and the display section.

A plurality of source selectors 13S, test switching elements 15SW, and buffers 16A can be provided for one display section. In this case, fixed potentials applied from the respective buffers 16A to the wiring that transmits the video signal Vsig can be different values. For example, a positive fixed potential +Vgray and a negative fixed potential -Vgray can be applied, respectively.

Figure 21:
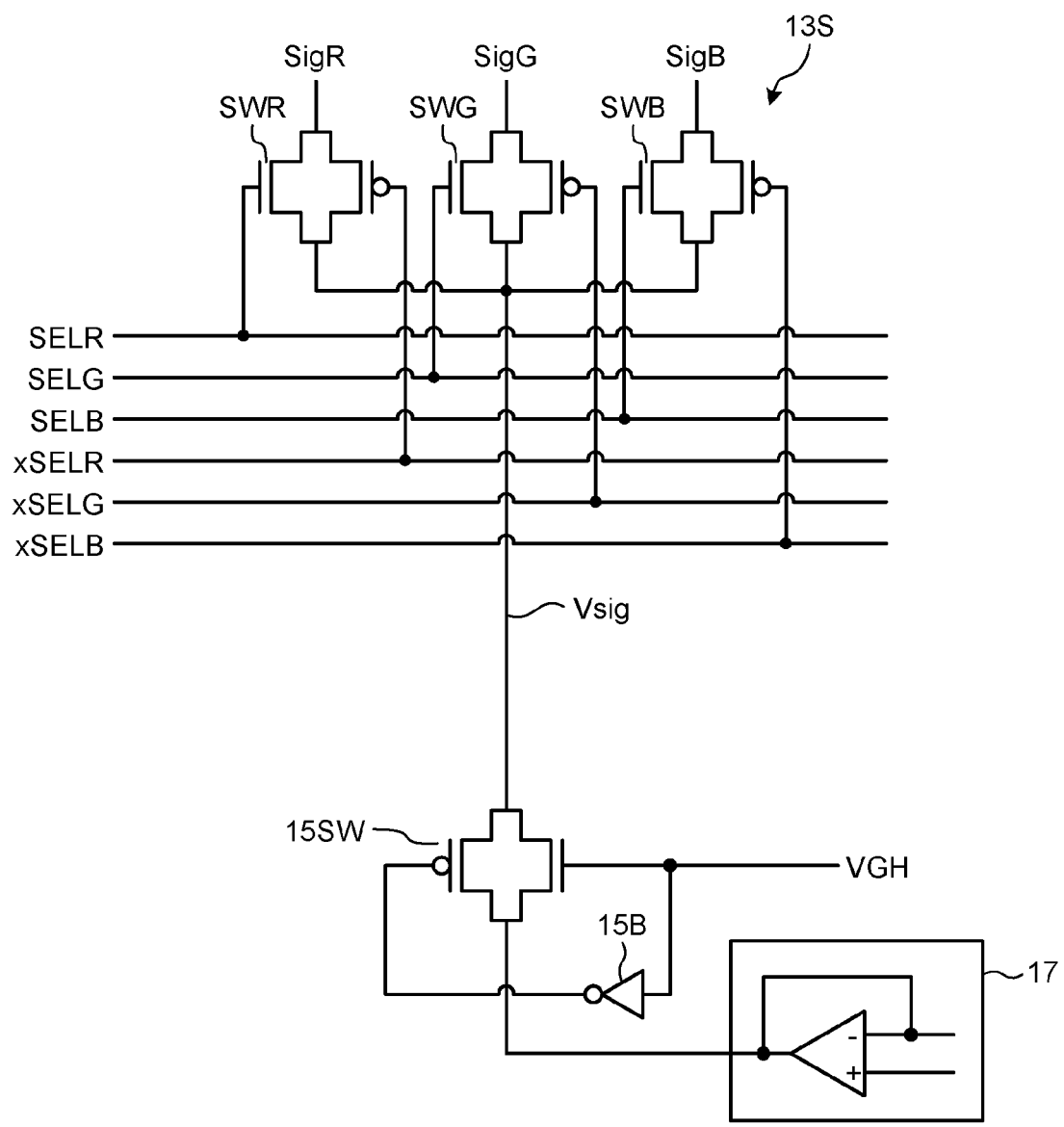
FIG. 21 is a configuration example in a case where an operation of a display section is checked.

A case where the operation of the display section is checked using the test switching element 15SW is explained with reference to FIG. 21. FIG. 21 is a configuration example in a case where an operation of a display section is checked. When the operation of the display section is to be checked, the power supply voltage VGH is applied to the gate of the NMOSTr of the test switching element 15SW and a voltage obtained by inverting the power supply voltage VGH with the inverter 15B is applied to the gate of the PMOSTr of the test switching element 15SW. This configuration sets the test switching element 15SW in the ON state. When a test signal is output from an evaluation board 17 with the test switching element 15SW being set in the ON state, the test signal is applied to the display section via the test switching element 15SW and the source selector 13S. This application of the test signal enables checking of the operation of the display section.

When a plurality of source selectors 13S and plural test switching elements 15SW are provided for one display section, the test signal output from the evaluation board 17 is applied to the display section via each of the test switching elements 15SW and each of the source selectors 13S, thereby checking the operation of the display section.

Third Embodiment

Figure 22:
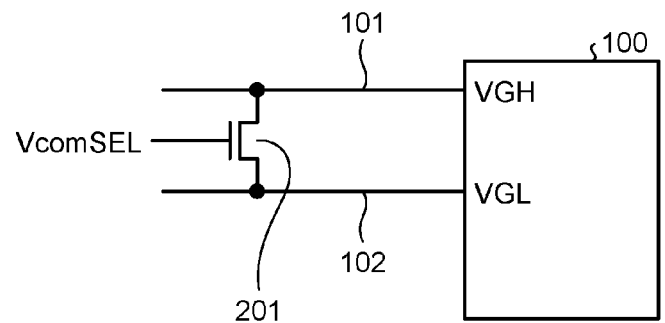
FIG. 22 is a configuration example of a power consumption unit according to a third embodiment.

FIG. 22 is a configuration example of a power consumption unit according to a third embodiment. In the third embodiment, a MOS transistor 201 is provided between wirings of power supply voltages and functions as the power consumption unit.

Figure 23:
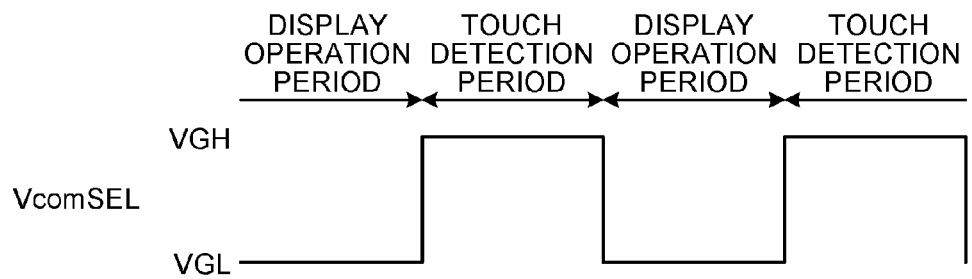
FIG. 23 is a waveform chart representing an example of an operation of the third embodiment.

A source of the MOS transistor 201 is coupled to the wiring 101 and a drain thereof is coupled to the wiring 102. A signal VcomSEL is supplied to a gate of the MOS transistor 201. The signal VcomSEL has the same potential as the power supply voltage VGL in the display operation period and the same potential as the power supply voltage VGH in the touch detection period as illustrated in FIG. 23. Therefore, the MOS transistor 201 is brought into an ON state and a current flows therethrough in the touch detection period, which is the period other than the display operation period. Accordingly, the MOS transistor 201 consumes power in the touch detection period.

Figure 24:
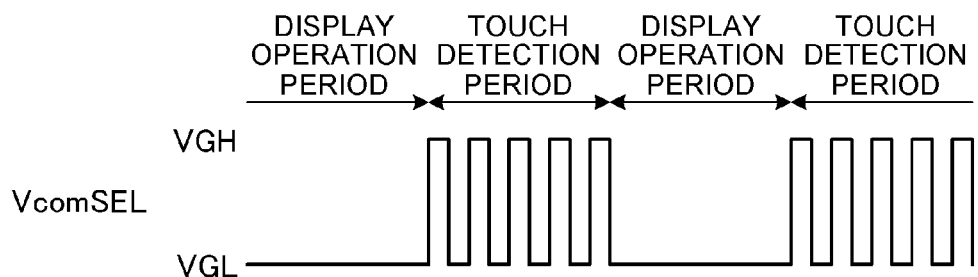
FIG. 24 is a waveform chart representing an example of the operation of the third embodiment.

The signal VcomSEL can be a signal that has a state of having the same potential as the power supply voltage VGL and a state of having the same potential as the power supply voltage VGH continuously repeating in the touch detection period, as illustrated in FIG. 24.

In the third embodiment, the amount of consumed power is adjusted by the MOS transistor 201 as described above and the voltages applied to the smoothing capacitors C11 and C12 in the touch detection period are caused to be substantially equal to the voltages applied thereto in the display operation period, so that the audible noise of the smoothing capacitors C11 and C12 can be suppressed or reduced.

Specifically, the period in which the MOS transistor 201 is turned ON is adjusted such that power consumption in the respective units to which the wirings 101 and 102 supply power is substantially the same between the touch detection period and the display operation period. As a difference in the power consumption between the touch detection period and the display operation period is smaller, the periodic changes of the voltages applied to the smoothing capacitors can be reduced more and the audible noise of the smoothing capacitors can be suppressed or reduced more. When the difference in the power consumption between the touch detection period and the display operation period is, for example, smaller than 30%, the periodic changes of the voltages applied to the smoothing capacitors can be reduced to such an extent that the audible noise of the smoothing capacitors can be suppressed or reduced.

Fourth Embodiment

Figure 25:
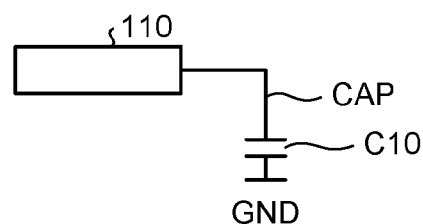
FIG. 25 is a configuration example of a power consumption unit according to a fourth embodiment.

FIG. 25 is a configuration example of a power consumption unit according to a fourth embodiment. In the fourth embodiment, a capacitor is provided as the power consumption unit. As illustrated in FIG. 25, a capacitor C10 is provided between the power supply circuit 110 and a ground potential GND. In the fourth embodiment, the capacitor C10 is controlled to perform a charge and discharge operation to consume power.

Figure 26:
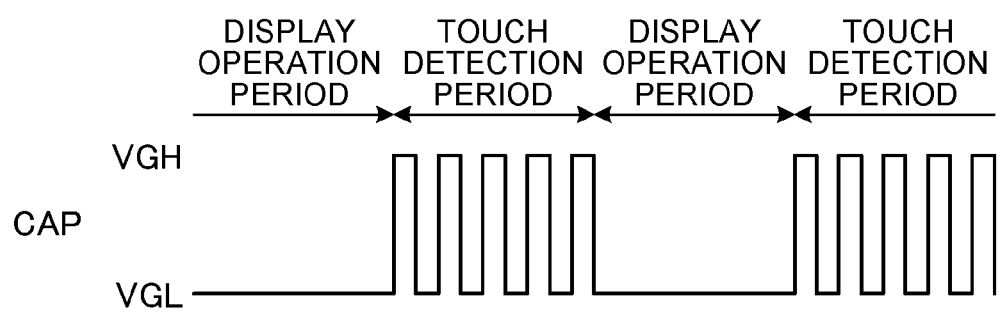
FIG. 26 is a waveform chart representing an example of an operation of the fourth embodiment.

The power supply circuit 110 outputs a signal CAP to the capacitor C10. The signal CAP has the same potential as the power supply voltage VGL in the display operation period as illustrated in FIG. 26. The signal CAP has a state of having the same potential as the power supply voltage VGL and a state of having the same potential as the power supply voltage VGH repeating in the touch detection period. Accordingly, the capacitor C10 repeats the charge operation and the discharge operation in the touch detection period. Therefore, the capacitor C10 consumes power in the touch detection period. When the repetition frequency of the signal CAP in the touch detection period and the capacitance of the capacitor C10 are appropriately set, the amount of consumed power of the display device 1 with a touch detection function in the touch detection period can be adjusted. By adjusting the amount of consumed power due to the charge operation and the discharge operation of the capacitor C10 and causing the voltages applied to the smoothing capacitors C11 and C12 in the touch detection period to be substantially equal to the voltages applied thereto in the display operation period, the audible noise of the smoothing capacitors C11 and C12 can be suppressed or reduced.

Specifically, the repetition frequency of the signal CAP in the touch detection period and the capacitance of the capacitor C10 are adjusted to set power consumption in the respective units to which power is supplied by the wirings 101 and 102 to be substantially the same in the touch detection period and the display operation period.

As a difference between the power consumption in the touch detection period and the power consumption in the display operation period is smaller, the periodic changes of the voltages applied to the smoothing capacitors can be reduced more and the audible noise of the smoothing capacitors can be suppressed or reduced more. When the power consumption difference between the touch detection period and the display operation period is, for example, smaller than 30%, the periodic changes of the voltages applied to the smoothing capacitors can be reduced to such an extent that the audible noise of the smoothing capacitors can be suppressed or reduced.

The capacitor C10 can be provided on the TFT substrate 21 or the flexible printed circuit board T.

Fifth Embodiment

In the embodiments described above, examples where power consumption of the display section as the constituent element for display is set to be substantially equal between the touch detection period and the display operation period have been explained. However, the display device 1 with a touch detection function can be configured to set power consumption including that of other constituent elements to be substantially equal between the touch detection period and the display operation period.

Figure 27:
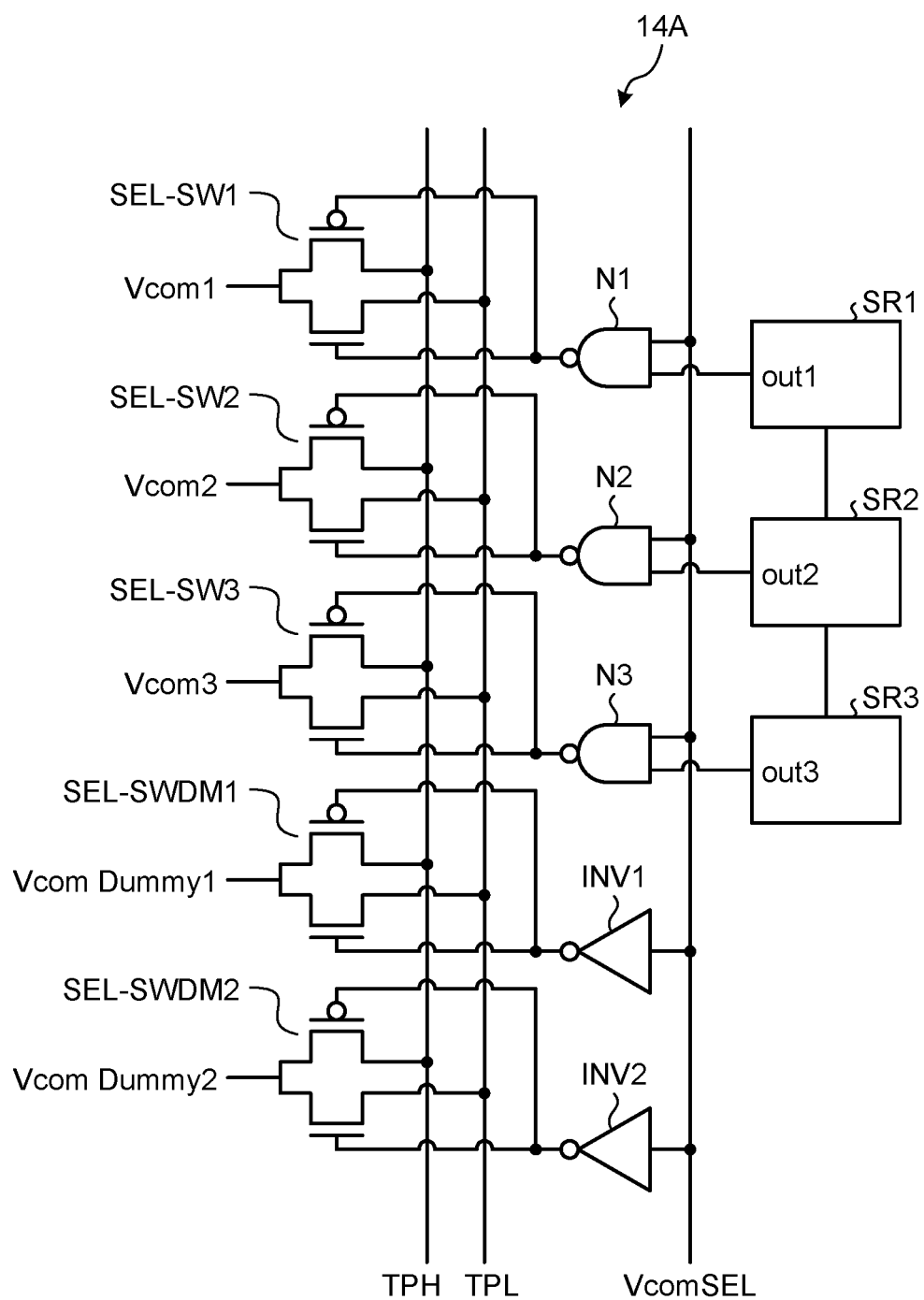
FIG. 27 is a configuration example of a power consumption unit according to a fifth embodiment.

FIG. 27 is a configuration example of a case where power consumption including that of constituent elements other than a display section is set to be substantially equal between a touch detection period and a display operation period. In the example illustrated in FIG. 27, dummy switches provided in the drive-electrode scanning unit 14A are assumed as a power consumption unit.

As illustrated in FIG. 27, the drive-electrode scanning unit 14A includes shift registers SR1, SR2, and SR3, NAND gates N1, N2, and N3, and select switches SEL-SW1, SEL-SW2, and SEL-SW3. These are constituent elements generally provided in the display device with a touch detection function. Whether or not there is a touch to the touch detection device 30 is detected by inputting drive signals Vcom1, Vcom2, and Vcom3 output from the drive-electrode scanning unit 14A to the touch detection device 30.

In the embodiment, inverters INV1 and INV2 and dummy select switches SWL-SWDM1 and SEL-SWDM2 are added to the configuration mentioned above. Output signals out1, out2, and out3 from the shift registers SR1, SR2, and SR3 are input to first input terminals of the NAND gates N1, N2, and N3, respectively. The signal VcomSEL is input to second input terminals of the NAND gates N1, N2, and N3.

Each of the select switches SEL-SW1, SEL-SW2, and SEL-SW3 and the dummy select switches SEL-SWDM1 and SEL-SWDM2 is constituted by an NMOSTr and a PMOSTr having drains coupled to each other. Output signals of the NAND gates N1, N2, and N3 are input to respective gates of the NMOSTrs and the PMOSTrs constituting the select switches SEL-SW1, SEL-SW2, and SEL-SW3, respectively. The power supply voltage TPH is input to a source of each of the PMOSTrs constituting the select switches SEL-SW1, SEL-SW2, and SEL-SW3 and the power supply voltage TPL is input to a source of each of the NMOSTrs constituting the select switches SEL-SW1, SEL-SW2, and SEL-SW3.

The drive signals Vcom1, Vcom2, and Vcom3 are output from the drains of the NMOSTrs and PMOSTrs constituting the select switches SEL-SW1, SEL-SW2, and SEL-SW3, respectively. The drive signals Vcom1, Vcom2, and Vcom3 are input to the display unit 10 with a touch detection function.

The signal VcomSEL is input to the inverters INV1 and INV2. Output signals of the inverters INV1 and INV2 are input to respective gates of the NMOSTrs and the PMOSTrs constituting the dummy select switches SEL-SWDM1 and SEL-SWDM2, respectively.

The power supply voltage TPH is input to a source of each of the PMOSTrs constituting the dummy select switches SEL-SWDM1 and SEL-SWDM2 and the power supply voltage TPL is input to a source of each of the NMOSTrs constituting the dummy select switches SEL-SWDM1 and SEL-SWDM2.

The drains of the NMOSTrs and the PMOSTrs constituting the dummy select switches SEL-SWDM1 and SEL-SWDM2 are coupled to no unit. Therefore, dummy outputs Vcom Dummy1 and Vcom Dummy 2 output from the dummy select switches SEL-SWDM1 and SEL-SWDM2, respectively, are used to consume power.

Figure 28:
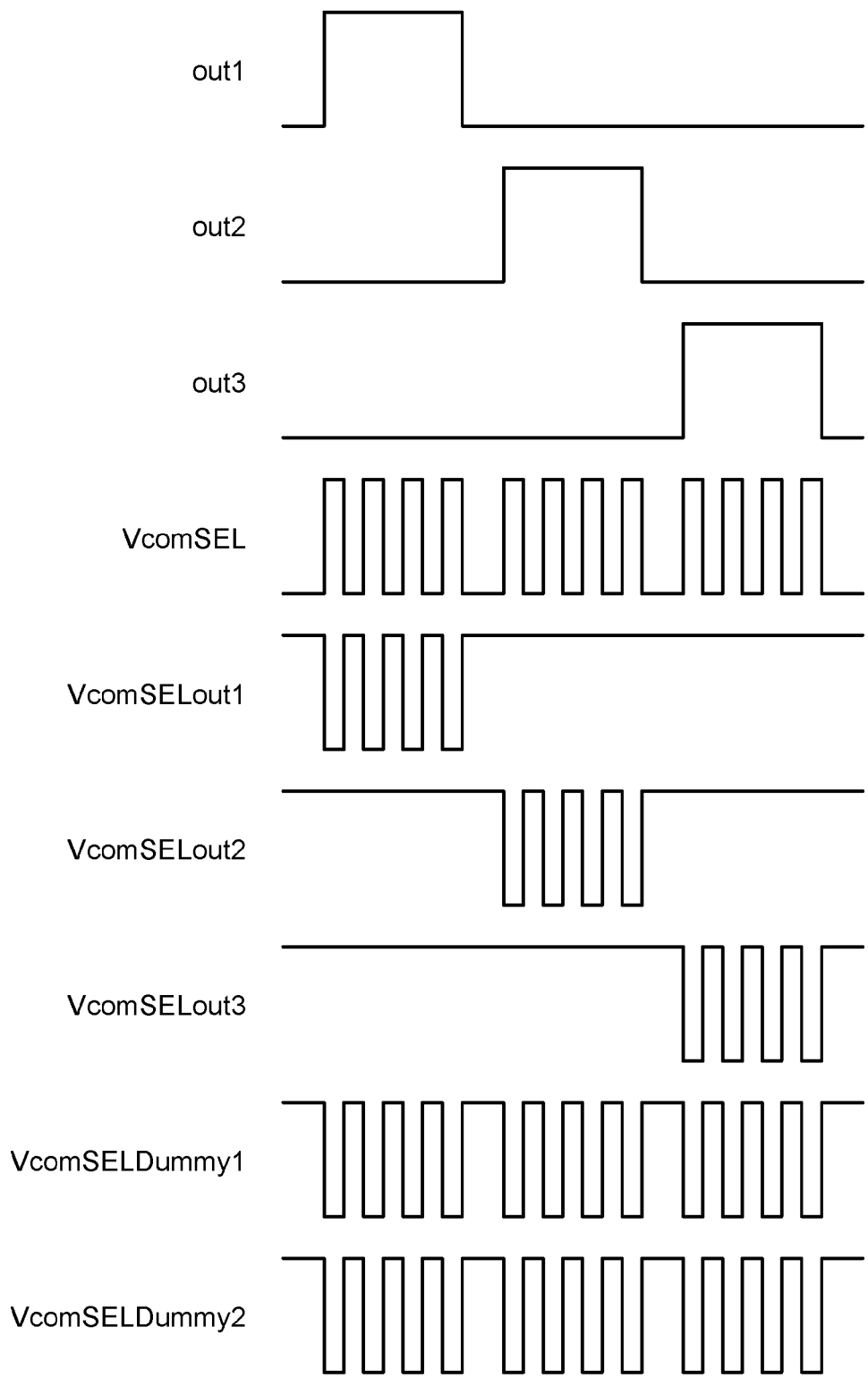
FIG. 28 is a waveform chart representing an example of an operation of the fifth embodiment.

An operation of the drive-electrode scanning unit 14A is explained next with reference to FIG. 28. In a period in which the signal out1 output from the shift register SR1 has an H potential in FIG. 28, a signal VcomSELout1 obtained by inverting the signal VcomSEL is input by the NAND gate N1 to the gates of the NMOSTr and the PMOSTr constituting the select switch SEL-SW1. Accordingly, the NMOSTr and the PMOSTr constituting the select switch SEL-SW1 are alternately turned ON, so that the power supply voltage TPH and the power supply voltage TPL are alternately input to the touch detection device 30 as the drive signal Vcom1.

In a period in which the signal out2 output from the shift register SR2 has an H potential, a signal VcomSELout2 obtained by inverting the signal VcomSEL is input by the NAND gate N2 to the gates of the NMOSTr and the PMOSTr constituting the select switch SEL-SW2. Accordingly, the NMOSTr and the PMOSTr constituting the select switch SEL-SW2 are alternately turned ON, so that the power supply voltage TPH and the power supply voltage TPL are alternately input as the drive signal Vcom2 to the touch detection device 30.

In a period in which the signal out3 output from the shift register SR3 has an H potential, a signal VcomSELout3 obtained by inverting the signal VcomSEL is input by the NAND gate N3 to the gates of the NMOSTr and the PMOSTr constituting the select switch SEL-SW3. Accordingly, the NMOSTr and the PMOSTr constituting the select switch SEL-SW3 are alternately turned ON and thus the power supply voltage TPH and the power supply voltage TPL are alternately input as the drive signal Vcom3 to the touch detection device 30.

The signal VcomSEL is input to the inverters INV1 and INV2 and the output signals from the inverters INV1 and INV2 are input to the gates of the NMOSTrs and the PMOSTrs constituting the dummy select switches SEL-SWDM1 and SEL-SWDM2, respectively. Therefore, the NMOSTr and the PMOSTr constituting the dummy select switch SEL-SWDM1 are alternately turned ON and thus the power supply voltage TPH and the power supply voltage TPL alternately become the dummy output Vcom Dummy1. The NMOSTr and the PMOSTr constituting the dummy select switch SEL-SWDM2 are also alternately turned ON and thus the power supply voltage TPH and the power supply voltage TPL alternately become the dummy output Vcom Dummy2.

Power is consumed by turning ON the dummy select switches SEL-SWDM1 and SEL-SWDM2 in this way.

In a case of DC-DC drive, the power supply voltages VGH and VGL are consumed because the drive-electrode scanning unit 14A is turned ON and OFF in the touch detection period. However, power consumption in the touch detection period is less than power consumption in the display operation period. For example, power consumption in the touch detection period is about one third of that in the display operation period. Accordingly, in the first modification, the two dummy select switches SEL-SWDM1 and SEL-SWDM2 are added and are turned ON and OFF in the touch detection period. As a result, the amount of consumed power in the touch detection period can be tripled and thus the amount of consumed power substantially identical to that in the display operation period can be achieved in the touch detection period.

In the embodiment, the power consumption of the display device 1 with a touch detection function in the touch detection period can be adjusted by increasing or decreasing the number of dummy select switches. By adjusting the number of dummy select switches and setting the voltages applied to the smoothing capacitors C13 and C14 in the touch detection period to be substantially equal to the voltages applied thereto in the display operation period, the audible noise of the smoothing capacitors C13 and C14 can be suppressed or reduced. Specifically, the number of dummy select switches is adjusted to set power consumption in the respective units to which power is supplied by the wirings 103 and 104 to be substantially equal between the touch detection period and the display operation period. As a difference between the power consumption in the touch detection period and the power consumption in the display operation period is smaller, the periodic changes of the voltages applied to the smoothing capacitors can be reduced more and the audible noise of the smoothing capacitors can be suppressed or reduced more. When the difference in the power consumption between the touch detection period and the display operation period is, for example, less than 30%, the periodic changes of the voltages applied to the smoothing capacitors can be reduced to such an extent that the audible noise of the smoothing capacitors can be suppressed or reduced.

First Modification

The first to fifth embodiments can be independently carried out. Accordingly, several ones of the first to fifth embodiments can be combined. When the amount of power that can be consumed by carrying out one of the first to fifth embodiments is small, consumed power may be appropriately set by combining other one or more of the first to fifth embodiments.

Second Modification

Cases where a first period in which predetermined power is consumed is the display operation period and a second period in which less power is consumed than in the first period is the touch detection period have been explained above. However, the first and second periods are not limited thereto. The first period and the second period can be a period in which relatively more power is consumed among periods between which power consumption of at least one of the constituent elements of the display device changes periodically and a period in which relatively less power is consumed, respectively.

Comparative Example

A case where configurations of the embodiments described above are not adopted is explained.

In a case where the touch detection operation is performed once or plural times while the display device performs the display operation of one screen, the display operation period and the touch detection period may be provided as operation states. The display operation period is a period in which predetermined power is consumed and the touch detection period is a period in which less power is consumed than in the display operation period.

Figure 29:
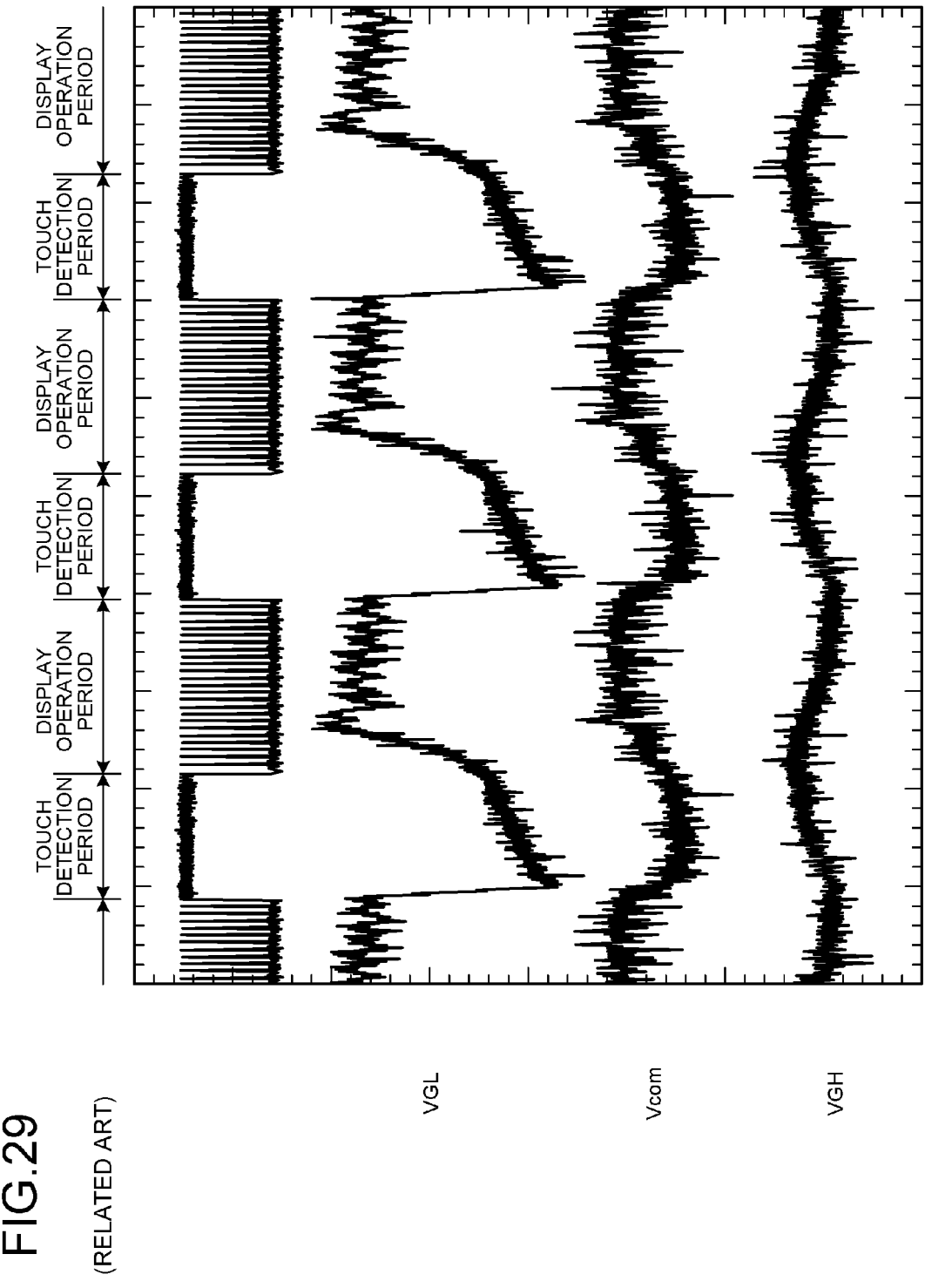
FIG. 29 is a waveform chart representing an example of changes in power supply voltages and a voltage value of a drive signal in a touch detection period and a display operation period.

FIG. 29 is a waveform chart representing an example of changes in the power supply voltages VGL and VGH and the voltage value of the drive signal Vcom in a touch detection period and a display operation period. As illustrated in FIG. 29, the power supply voltages VGL and VGH and the voltage value of the drive signal Vcom change according switching between the display operation period and the touch detection period. Particularly, with respect to the power voltage VGL, power is consumed less in the touch detection period while power is consumed more in the display operation period. That is, with respect to the display unit 10, there are the first period (the display operation period) in which predetermined power is consumed and the second period (the touch detection period) in which less power is consumed than in the first period.

As illustrated in FIG. 29, the display device repeats the display operation period and the touch detection period, so that power consumption changes periodically (at 3.2 kilohertz, for example). When the power consumption changes periodically, the voltages applied to the smoothing capacitors change periodically and thus the smoothing capacitor vibrates. Therefore, when the cycle in which the power consumption changes is included in an audible range, vibrations of the smoothing capacitors may be heard as the audible noise.

Accordingly, by consuming power that is normally not consumed in the touch detection period as in the above embodiments, a difference between power consumption in the display operation period and power consumption in the touch detection period can be eliminated or reduced, vibrations of the smoothing capacitors can be eliminated or reduced, and the audible noise can be suppressed or reduced.

5. Application Examples

With reference to FIGS. 30 to 42, application examples of the display device 1 with a touch detection function explained in the above embodiments and modifications are explained. FIGS. 30 to 42 illustrate examples of an electronic apparatus to which the display device 1 with a touch detection function according to one of the embodiments and the modifications thereof is applied. It is possible to apply the display device 1 with a touch detection function according to the above embodiments and modifications to electronic apparatuses in any field, including a television device, a digital camera, a laptop personal computer, a portable terminal device such as a portable phone, a video camera, and the like. In other words, it is possible to apply the display device 1 with a touch detection function according to the above embodiments and modifications to electronic apparatuses in any field, which display a video signal input externally or a video signal generated internally as an image or a video.

Application Example 1

Figure 30:
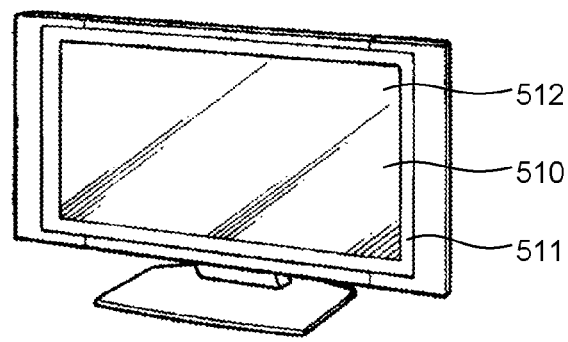
FIG. 30 is an example of an electronic apparatus to which the display device with a touch detection function according to one of the embodiments and the modifications thereof is applied.

An electronic apparatus illustrated in FIG. 30 is a television device to which the display device 1 with a touch detection function according to the above embodiments and modifications is applied. This television device includes a video display screen unit 510 that includes a front panel 511 and a filter glass 512, for example. The video display screen unit 510 is the display device 1 with a touch detection function according to the above embodiments and modifications.

Application Example 2

Figure 31:
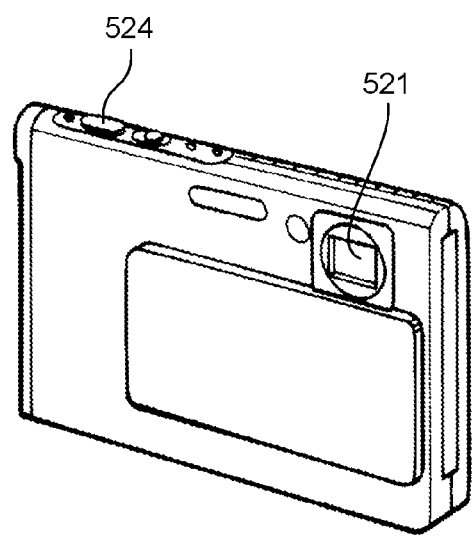
FIG. 31 is another example of the electronic apparatus to which the display device with a touch detection function according to one of the embodiments and the modifications thereof is applied.
Figure 32:
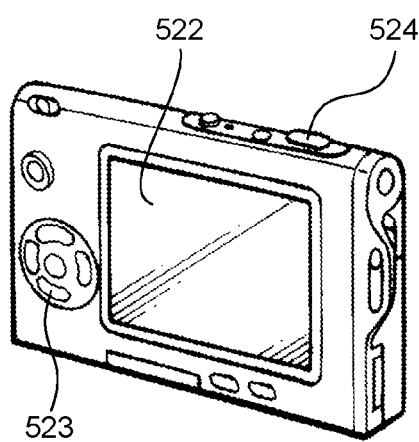
FIG. 32 is still another example of the electronic apparatus to which the display device with a touch detection function according to one of the embodiments and the modifications thereof is applied.

An electronic apparatus illustrated in FIGS. 31 and 32 is a digital camera to which the display device 1 with a touch detection function according to the above embodiments and modifications is applied. This digital camera includes a flash-light producing unit 521, a display unit 522, a menu switch 523, and a shutter button 524, for example. The display unit 522 is the display device 1 with a touch detection function according to the above embodiments and modifications.

Application Example 3

Figure 33:
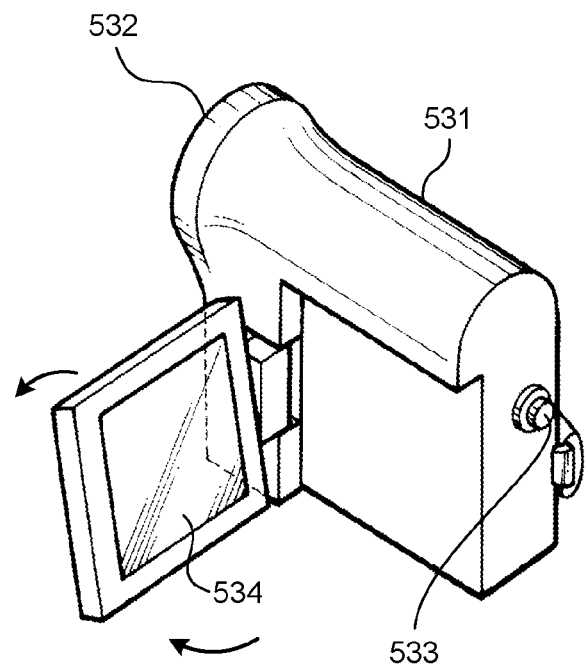
FIG. 33 is still another example of the electronic apparatus to which the display device with a touch detection function according to one of the embodiments and the modifications thereof is applied.

An electronic apparatus illustrated in FIG. 33 is a video camera to which the display device 1 with a touch detection function according to the above embodiments and modifications is applied, and FIG. 33 illustrates its external appearance. This video camera includes a main unit 531, a subject capturing lens 532 that is provided on the front side of the main unit 531, an image-capturing start/stop switch 533, and a display unit 534, for example. The display unit 534 is the display device 1 with a touch detection function according to the above embodiments and modifications.

Application Example 4

Figure 34:
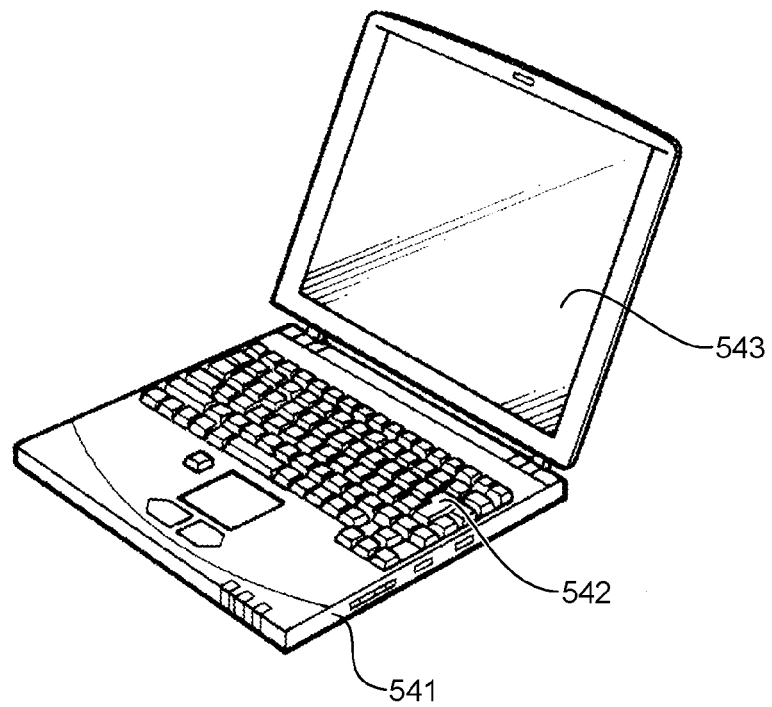
FIG. 34 is still another example of the electronic apparatus to which the display device with a touch detection function according to one of the embodiments and the modifications thereof is applied.

An electronic apparatus illustrated in FIG. 34 is a laptop personal computer to which the display device 1 with a touch detection function according to the above embodiments and modifications is applied. This laptop personal computer includes a main unit 541, a keyboard 542 for an operation to input text and the like, and a display unit 543 that displays an image. The display unit 543 is the display device 1 with a touch detection function according to the above embodiments and modifications.

Application Example 5

Figure 35:
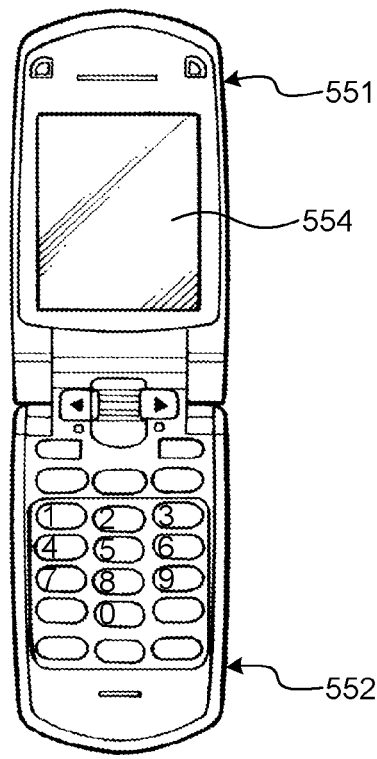
FIG. 35 is still another example of the electronic apparatus to which the display device with a touch detection function according to one of the embodiments and the modifications thereof is applied.
Figure 36:
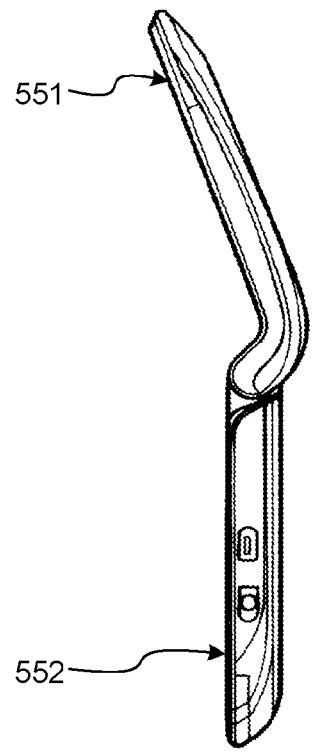
FIG. 36 is still another example of the electronic apparatus to which the display device with a touch detection function according to one of the embodiments and the modifications thereof is applied.
Figure 37:
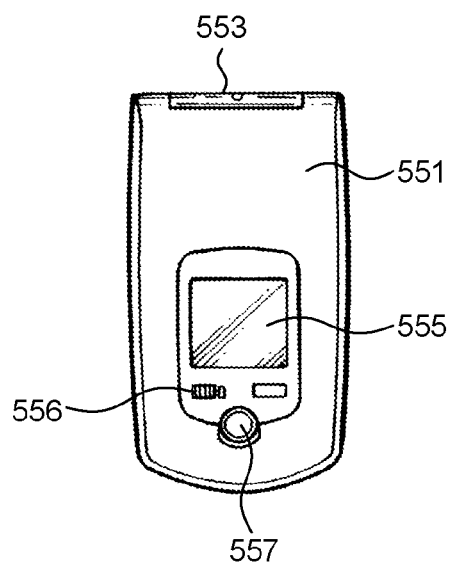
FIG. 37 is still another example of the electronic apparatus to which the display device with a touch detection function according to one of the embodiments and the modifications thereof is applied.
Figure 38:
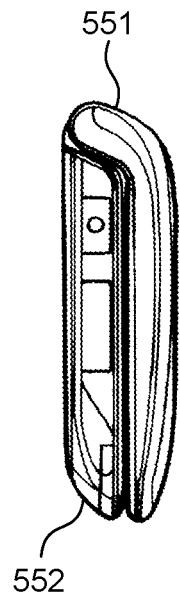
FIG. 38 is still another example of the electronic apparatus to which the display device with a touch detection function according to one of the embodiments and the modifications thereof is applied.
Figure 39:
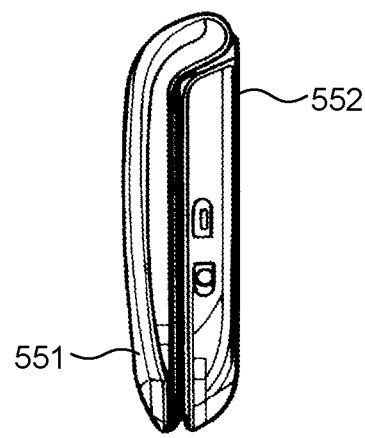
FIG. 39 is still another example of the electronic apparatus to which the display device with a touch detection function according to one of the embodiments and the modifications thereof is applied.
Figure 40:
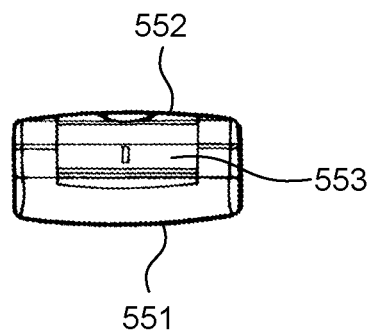
FIG. 40 is still another example of the electronic apparatus to which the display device with a touch detection function according to one of the embodiments and the modifications thereof is applied.
Figure 41:
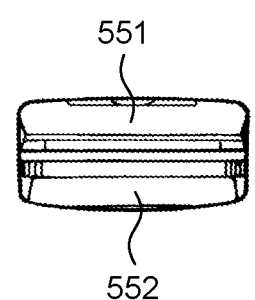
FIG. 41 is still another example of the electronic apparatus to which the display device with a touch detection function according to one of the embodiments and the modifications thereof is applied.

An electronic apparatus illustrated in FIGS. 35 to 41 is a portable phone to which the display device 1 with a touch detection function according to the above embodiments and modifications is applied. FIG. 35 is a front view of a state where the portable phone is opened, FIG. 36 is a right side view of a state where the portable phone is opened, FIG. 37 is a front view of a state where the portable phone is folded, FIG. 38 is a left side view of a state where the portable phone is folded, FIG. 39 is a right side view of a state where the portable phone is folded, FIG. 40 is a plan view of a state where the portable phone is folded, and FIG. 41 is a bottom view of a state where the portable phone is folded. This portable phone is configured by coupling an upper casing 551 and a lower casing 552 by a coupling unit (a hinge) 553, and includes a display 554, a sub-display 555, a picture light 556, and a camera 557. The display 554 or the sub-display 555 is the display device 1 with a touch detection function according to the above embodiments and modifications.

Application Example 6

Figure 42:
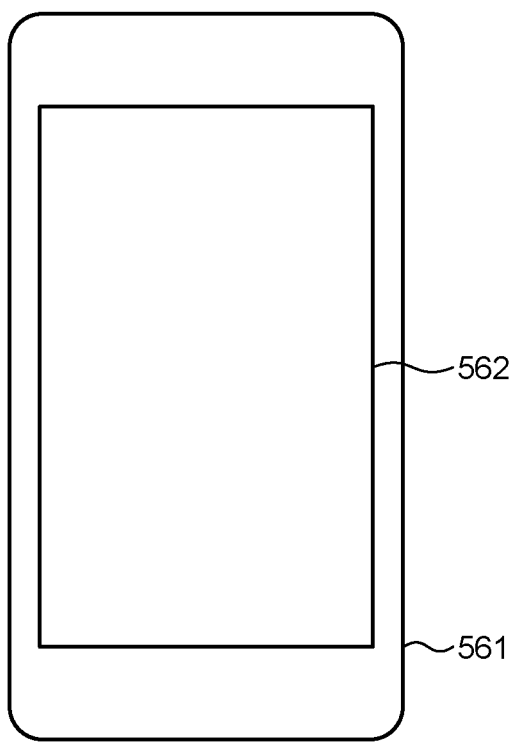
FIG. 42 is still another example of the electronic apparatus to which the display device with a touch detection function according to one of the embodiments and the modifications thereof is applied.

An electronic apparatus illustrated in FIG. 42 is a portable information terminal that operates as a portable computer, a multi-functional portable phone, a portable computer capable of making a voice call, or a portable computer capable of other forms of communication, and that is also referred to as so-called "smartphone" or "tablet terminal". This portable information terminal includes a display unit 562 on a surface of a casing 561, for example. The display unit 562 is the display device 1 with a touch detection function according to the above embodiments and modifications.

While the present disclosure has been explained above by describing embodiments and application examples thereof to an electronic device, the present disclosure is not limited to the above embodiments and the like, and various modifications can be made.

For example, in the above embodiments and the like, the touch sensor has been explained as a capacitance-type sensor; however, the present disclosure is not limited thereto, and instead of a capacitance-type sensor, for example, an optical sensor or a resistive sensor can be used.

Furthermore, for example, in the above embodiments and the like, the display element has been explained as a liquid-crystal display element; however, the present disclosure is not limited thereto, and instead of a liquid-crystal display element, an EL (Electro Luminescence) element can be used.

Further, in the above embodiments and the like, the first period is a display operation period of the display device 1 with a touch detection function and the second period is a touch detection period of the display device 1 with a touch detection function; however, these periods are not limited thereto, and the present disclosure can be applied to a device that has a first period to consume predetermined power and a second period to consume less power than in the first period, and repeats the first period and the second period to periodically change power consumption.

6. Aspects of the Present Disclosure

The present disclosure includes aspects as follows.
(1) A display device comprising:
a display section that has a first period to consume predetermined power and a second period to consume less power than in the first period, and power consumption of which periodically changes by repeating the first period and the second period;
a smoothing capacitor that stabilizes power supplied to the display section; and
a power consumption unit that consumes the supplied power in the second period.
(2) The display device according to (1), wherein
the display section has a touch detection device incorporated in a displaying device in an integrated manner,
the first period is a display operation period of the displaying device, and
the second period is a touch detection period of the touch detection device.
(3) The display device according to (1), further comprising a test switching element that operates to apply a test signal to the display section when a test for checking an operation of the display is performed, wherein
the power consumption unit consumes power by causing the test switching element to operate in the second period.
(4) The display device according to (3), further comprising a signal application unit that applies a signal for keeping a voltage value of a signal line located between the test switching element and the display section constant to the signal line in the second period.

(5) The display device according to (4), wherein the signal for keeping a voltage value of the signal line constant is a signal for setting a voltage value of a pixel signal line provided in the display section to a predetermined voltage value in the second period.

(6) The display device according to (1), wherein the power consumption unit includes a switching element that operates in the first period, and the switching element operates also in the second period to consume the supplied power.

(7) The display device according to (6), wherein the switching element includes a first transistor element and a second transistor element, the first and second transistor elements are controlled to be turned ON and OFF in predetermined cycles, respectively, to bring at least one of the first and second transistor elements in an ON state in any timing in the second period, and the predetermined cycles are set according to power consumption of the display section in the first period.

(8) The display device according to (7), wherein the number of the switching element included in the power consumption unit is plural, sources of the first transistor element and the second transistor element included in each switching element are coupled to each other and drains thereof are coupled to each other, one of the source and the drain of each of the first and second transistor elements included in a first switching element is coupled to a signal line coupled to the display section, and other of the source and the drain of each of the first and second transistor elements is coupled to a signal line provided in common with the first and second transistor elements included in a second switching element, and the power consumption unit is controlled to match timing of a transition of any one of the first and second transistor elements included in the first switching element from OFF to ON with timing of a transition of any one of the first and second transistor elements included in the second switching element from ON to OFF.

(9) The display device according to (8), wherein the power consumption unit is controlled to set some of the first and second transistor elements of the switching elements included therein to be always in ON states in the second period.

(10) The display device according to (8), wherein each switching element is provided to correspond to one of plural kinds of color signals included in a video signal corresponding to an image to be displayed on the display section, respectively.

(11) The display device according to (1), wherein the power consumption unit includes a dummy element that operates without affecting an operation of the display section in the first period, and the dummy element operates in the second period to consume the supplied power.

(12) The display device according to (1), further comprising a switching element that operates in the second period, wherein the power consumption unit includes a dummy element that operates with the switching element and operates without affecting an operation of the display section, and the dummy element operates in the second period to consume the supplied power.

(13) The display device according to (12), wherein the power consumption unit includes a predetermined number of the dummy elements, the predetermined number corresponding to power consumption of the display section in the first period and power consumption of the switching element in the second period.

(14) The display device according to (1), wherein the power consumption unit includes a capacitor that performs a charge and discharge operation using the supplied power, and the capacitor performs the charge and discharge operation in the second period.

(15) An electronic apparatus comprising the display device according to (1).

(16) The display device according to the (1), wherein the display section includes a touch detection device mounted on a displaying device, the first period is a display operation period of the displaying device, and the second period is a touch detection period of the touch detection device.

According to the present disclosure, the power consumption unit consumes supplied power in the second period. Therefore, a display device and an electronic apparatus that can suppress or reduce the audible noise of a smoothing capacitor can be achieved.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device comprising:
a display section that includes a display unit and a touch detection device, the touch detection device incorporated in the display unit in an integrated manner, wherein power consumption of the display section periodically changes by repeating a display operation period to perform a display operation of the display unit and a touch detection period to perform a touch detection operation of the touch detection device, by a time-divisionally multiplexed method;
a power supply circuit configured to supply a power voltage to the display section; and
a smoothing capacitor configured to stabilize the power voltage,
wherein the display section includes:
a plurality of drive electrodes that are supplied with a drive signal in the touch detection period; and
a drive electrode driver that is supplied with the power voltage by the power supply circuit and that is configured to supply the drive signal to the drive electrodes, and
wherein the drive electrode driver includes:
a switching element configured to generate the drive signal to be supplied to each of the drive electrodes by switching the power voltage; and
a dummy element configured to switch the power voltage together with the switching element without affecting an operation of the display section.

2. The display device according to claim 1, wherein the drive electrode driver includes a predetermined number of the dummy elements, the predetermined number corresponding to a power difference between first power that is supplied to the display section in the display operation period and a second power supplied to the display section in the touch detection period.

3. The display device according to claim 1, wherein a total power consumption of the dummy elements corresponds to a power difference between first power supplied to the display section in the display operation period and a second power supplied to the display section in the touch detection period.

\* \* \* \* \*